(12) United States Patent  
Mori

(10) Patent No.: US 6,697,202 B2
(45) Date of Patent: Feb. 24, 2004

(54) RETROFOCUS IMAGING LENS

(75) Inventor: Masao Mori, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 16 days.

(21) Appl. No.: 10/193,626

(22) Filed: Jul. 11, 2002

(65) Prior Publication Data

US 2003/0011895 A1 Jan. 16, 2003

(30) Foreign Application Priority Data

Jul. 12, 2001 (JP) ...................................... 2001-211937

(51) Int. Cl.⁷ ............................................... G02B 13/04
(52) U.S. Cl. ...................................... 359/749; 359/754
(58) Field of Search ................................. 359/749–753, 359/754, 755, 784, 793

(56) References Cited

U.S. PATENT DOCUMENTS 3,981,563 A * 9/1976 Nakamura .................. 359/749
5,828,490 A * 10/1998 Sato ........................... 359/557
5,949,589 A * 9/1999 Nakazawa .................. 359/753

FOREIGN PATENT DOCUMENTS

| JP | 55-147607 | 11/1980 |
| JP | 58-202414 | 11/1983 |
| JP | 59-216114 | 12/1984 |
| JP | 61-140910 | 6/1986 |
| JP | 62-35089 | 7/1987 |
| JP | 05-119254 | 5/1993 |
| JP | 09-113800 | 5/1997 |

* cited by examiner

Primary Examiner—Jordan M. Schwartz
(74) Attorney, Agent, or Firm—Frommer Lawrence & Haug, LLP; Matthew K. Ryan

(57) ABSTRACT

Provided is a retrofocus imaging lens in which various aberrations are satisfactorily corrected, having a sufficient space from a mechanism viewpoint so that a focus group does not interfere with a lens shutter mechanism even at the time of focusing according to a rear-focus system. A retrofocus imaging lens has, in order from an object side, a first lens group and a second lens group. The first lens group is constructed of, in order from the object side, a front-side first lens group having a negative refractive power as a whole and a rear-side first lens group having a positive refractive power as a whole. The first lens group is basically constructed to have a positive refractive power as a whole. The second lens group includes one or more positive lens and one or more negative lens and has a positive refractive power as a whole. Each of the front-side first lens group and the rear-side first lens group includes, basically, one or more positive lens and two negative lenses.

12 Claims, 22 Drawing Sheets

| EXAMPL 1 · LENS DATA |||||
|---|---|---|---|---|
| Si (SURFACE No.) | Ri (RADIUS OF CURVATURE) | Di (SURFACE SEPARATION) | Ndj (REFRACTIVE INDEX) | $\nu dj$ (ABBE No.) |
| 1 | 1.7850 | 0.0999 | 1.71300 | 53.9 |
| 2 | 2.8845 | 0.0070 | | |
| 3 | 1.4935 | 0.0600 | 1.80000 | 46.6 |
| 4 | 0.5909 | 0.2037 | | |
| 5 | 1.7543 | 0.0400 | 1.64250 | 37.1 |
| 6 | 0.6755 | 0.2433 | | |
| 7 | 2.2279 | 0.3198 | 1.80518 | 25.4 |
| 8 | 18.0428 | 0.0400 | | |
| 9 | 1.3602 | 0.2886 | 1.79483 | 47.4 |
| 10 | -0.7225 | 0.0901 | 1.64769 | 33.8 |
| 11 | -1.8716 | 0.0599 | | |
| 12 | 7.3123 | 0.0280 | 1.50000 | 55.5 |
| 13 | 0.8468 | 0.3141 | | |
| Stop | — | 0.1999 | | |
| fc | — | 0.0000 | | |
| 14 | 7.2751 | 0.0700 | 1.75645 | 51.1 |
| 15 | -0.9671 | 0.0302 | | |
| 16 | -0.5351 | 0.0658 | 1.66680 | 33.1 |
| 17 | 11.5187 | 0.0413 | | |
| 18 | -2.0310 | 0.1199 | 1.49700 | 81.5 |
| 19 | -0.5966 | 0.0671 | | |
| 20 | -3.9314 | 0.0999 | 1.49700 | 81.5 |
| 21 | -0.9658 | 1.3100 | | |

( f=1.0, Fno=3.5, 2ω=70.8° )

FIG. 5

| EXAMPLE 2 · LENS DATA |||||
|---|---|---|---|---|
| Si (SURFACE No.) | Ri (RADIUS OF CURVATURE) | Di (SURFACE SEPARATION) | Ndj (REFRACTIVE INDEX) | νdj (ABBE No.) |
| 1 | 1.9624 | 0.0557 | 1.75700 | 47.8 |
| 2 | 0.6802 | 0.2198 | | |
| 3 | -14.1635 | 0.0457 | 1.65412 | 39.7 |
| 4 | 1.2291 | 0.2921 | | |
| 5 | 2.2358 | 0.1133 | 1.80440 | 39.6 |
| 6 | -27.5510 | 0.0356 | | |
| 7 | 1.4334 | 0.2850 | 1.78590 | 44.2 |
| 8 | -1.0325 | 0.0461 | 1.68893 | 31.2 |
| 9 | -3.6936 | 0.0196 | | |
| 10 | 0.6892 | 0.0486 | 1.51454 | 54.6 |
| 11 | 0.5424 | 0.1193 | | |
| fc | — | 0.3699 | | |
| Stop | — | 0.2187 | | |
| fc | — | 0.0099 | | |
| 12 | -15.6187 | 0.0676 | 1.77250 | 49.6 |
| 13 | -0.8169 | 0.0215 | | |
| 14 | -0.5280 | 0.1709 | 1.66680 | 33.1 |
| 15 | 3.9520 | 0.0386 | | |
| 16 | -1.6723 | 0.1094 | 1.49700 | 81.5 |
| 17 | -0.6001 | 0.0060 | | |
| 18 | -3.6864 | 0.1094 | 1.49700 | 81.5 |
| 19 | -0.8488 | 1.3486 | | |

( f=1.0, Fno=3.5, 2ω=70.0° )

FIG. 6

| EXAMPLE 3 · LENS DATA ||||||
|---|---|---|---|---|---|
| | Si (SURFACE No.) | Ri (RADIUS OF CURVATURE) | Di (SURFACE SEPARATION) | Ndj (REFRACTIVE INDEX) | νdj (ABBE No.) |
| G1 / G1A | 1 | 1.1968 | 0.0508 | 1.79938 | 33.5 |
| | 2 | 0.5820 | 0.1592 | | |
| | 3 | 1.6823 | 0.0430 | 1.78785 | 46.9 |
| | 4 | 0.6713 | 0.1556 | | |
| | 5 | 4.0774 | 0.1829 | 1.80001 | 26.3 |
| | 6 | -2.9367 | 0.1637 | | |
| G1B | 7 | 0.9747 | 0.0864 | 1.79984 | 25.2 |
| | 8 | 0.7171 | 0.0156 | | |
| | 9 | 0.7781 | 0.2867 | 1.72743 | 53.9 |
| | 10 | -1.1560 | 0.0836 | | |
| | 11 | 3.6503 | 0.0412 | 1.50137 | 56.4 |
| | 12 | 0.6715 | 0.0489 | | |
| | fc | — | 0.2017 | | |
| | Stop | — | 0.1857 | | |
| | fc | — | 0.0391 | | |
| G2 | 13 | -4.8939 | 0.0684 | 1.79961 | 46.9 |
| | 14 | -0.9202 | 0.0367 | | |
| | 15 | -0.4424 | 0.0313 | 1.69533 | 31.7 |
| | 16 | -7.6166 | 0.0391 | | |
| | 17 | -1.2701 | 0.0977 | 1.60389 | 59.9 |
| | 18 | -0.5811 | 0.0041 | | |
| | 19 | -2.9651 | 0.1075 | 1.49700 | 81.5 |
| | 20 | -0.6379 | 1.2773 | | |

( f=1.0, Fno=3.4, 2ω=69.4° )

FIG. 7

| EXAMPLE 4 · LENS DATA |||||
|---|---|---|---|---|
| Si (SURFACE No.) | Ri (RADIUS OF CURVATURE) | Di (SURFACE SEPARATION) | Ndj (REFRACTIVE INDEX) | $\nu dj$ (ABBE No.) |
| 1 | 1.3153 | 0.0537 | 1.80610 | 40.9 |
| 2 | 0.6508 | 0.1668 | | |
| 3 | 2.1952 | 0.0457 | 1.80610 | 40.9 |
| 4 | 0.7039 | 0.2327 | | |
| 5 | 2.1107 | 0.1782 | 1.78470 | 26.3 |
| 6 | -3.7090 | 0.0597 | | |
| 7 | 1.0271 | 0.0994 | 1.80810 | 22.8 |
| 8 | 0.6846 | 0.2702 | 1.71300 | 53.9 |
| 9 | -1.4081 | 0.0634 | | |
| 10 | 6.1388 | 0.0469 | 1.51742 | 52.4 |
| 11 | 0.6896 | 0.1064 | | |
| fc | — | 0.1362 | | |
| Stop | — | 0.1963 | | |
| fc | — | 0.0517 | | |
| 12 | -2.3389 | 0.0636 | 1.77250 | 49.6 |
| 13 | -0.7832 | 0.0396 | | |
| 14 | -0.4079 | 0.0318 | 1.63980 | 34.5 |
| 15 | -13.8335 | 0.0298 | | |
| 16 | -1.3623 | 0.1024 | 1.61800 | 63.3 |
| 17 | -0.5700 | 0.0040 | | |
| 18 | -5.0946 | 0.1621 | 1.49700 | 81.5 |
| 19 | -0.6417 | 1.2993 | | |

( f=1.0, Fno=3.5, 2ω=69.4° )

| EXAMPLE | VALUES CORRESPONDING TO CONDITIONAL EXPRESSIONS | | | | | |
|---|---|---|---|---|---|---|
| | (1) f1a/f1b | (2) f1/f | (3) fn/f1a | (4) f1/f2 | (5) $\nu$2-i | |
| | | | | | $\nu$2-3 | $\nu$2-4 |
| 1 | -0.82 | 5.46 | 0.55 | 3.50 | 81.50 | 81.50 |
| 2 | -0.86 | 3.14 | 0.56 | 1.83 | 81.50 | 81.50 |
| 3 | -0.94 | 2.86 | 0.55 | 1.72 | NON-RELEVANT | 81.50 |
| 4 | -0.98 | 3.87 | 0.41 | 2.60 | 63.30 | 81.50 |

FIG. 9B

| EXAMPLE | FOCUSING AMOUNT (mm) |
|---|---|
| 1 | 0.1173 |
| 2 | 0.1250 |
| 3 | 0.1263 |
| 4 | 0.1177 |
| 5 | 0.1297 |

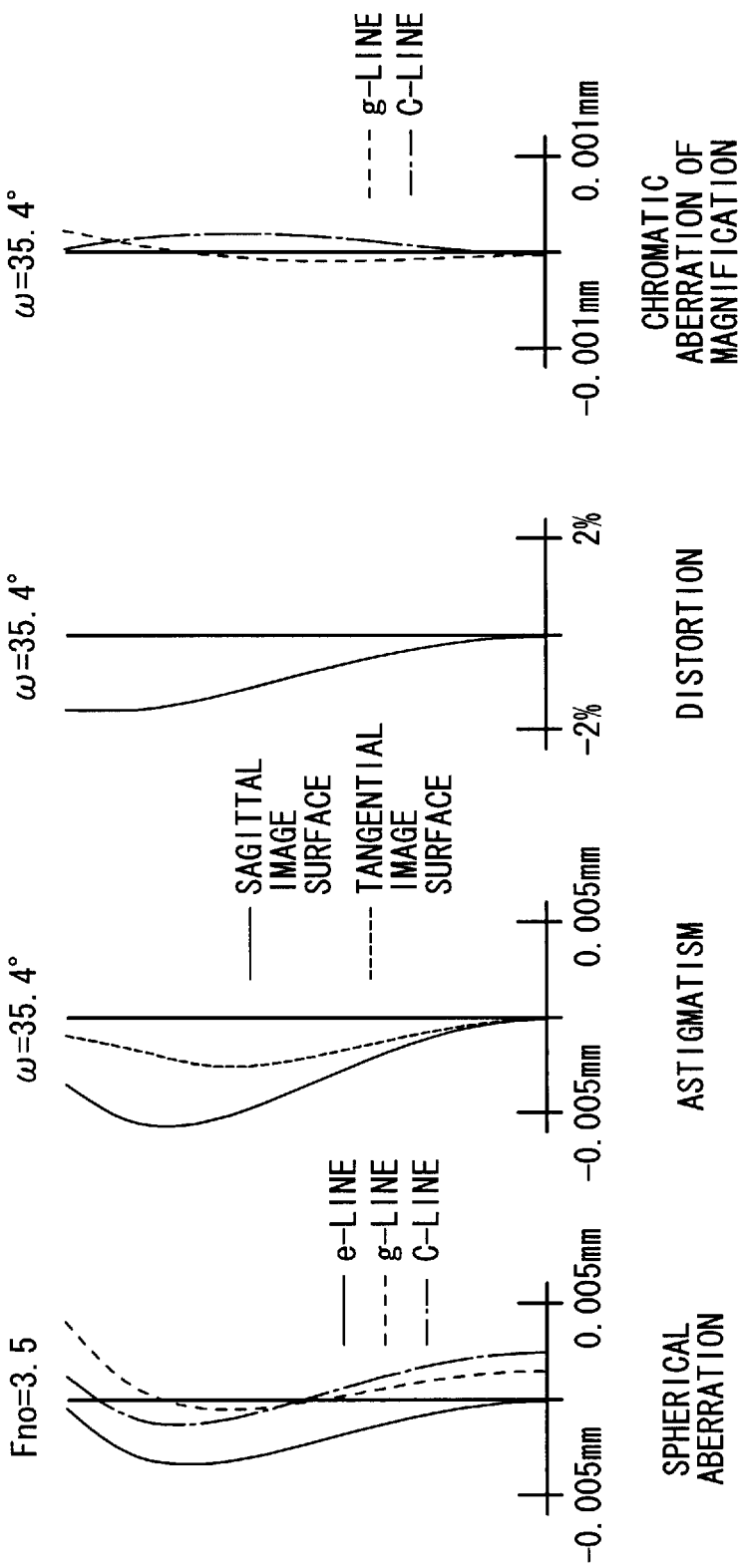

COMA (EXAMPLE 1)
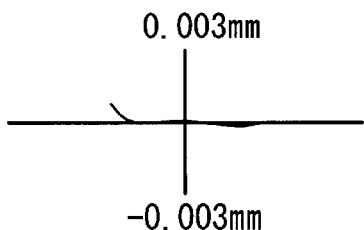
FIG. 11A  ω=35.4°
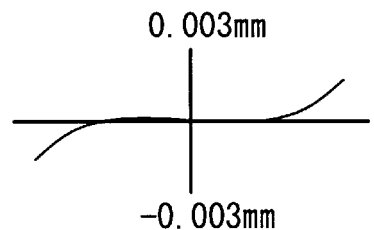
FIG. 11E
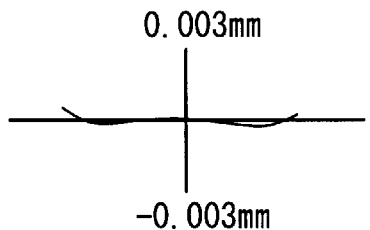
FIG. 11B  ω=26.4°
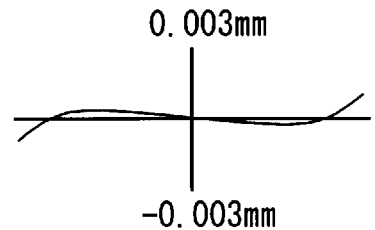
FIG. 11F
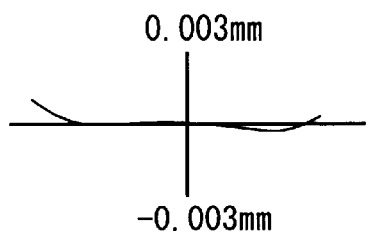
FIG. 11C  ω=19.4°
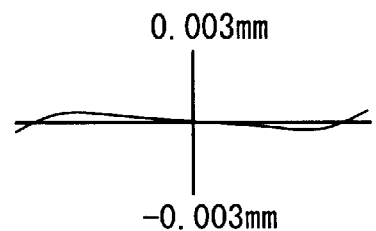
FIG. 11G
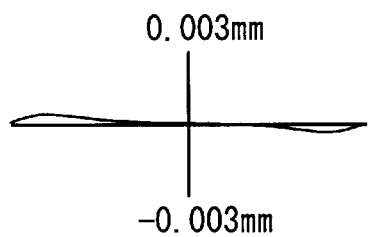
FIG. 11D  ω=0°

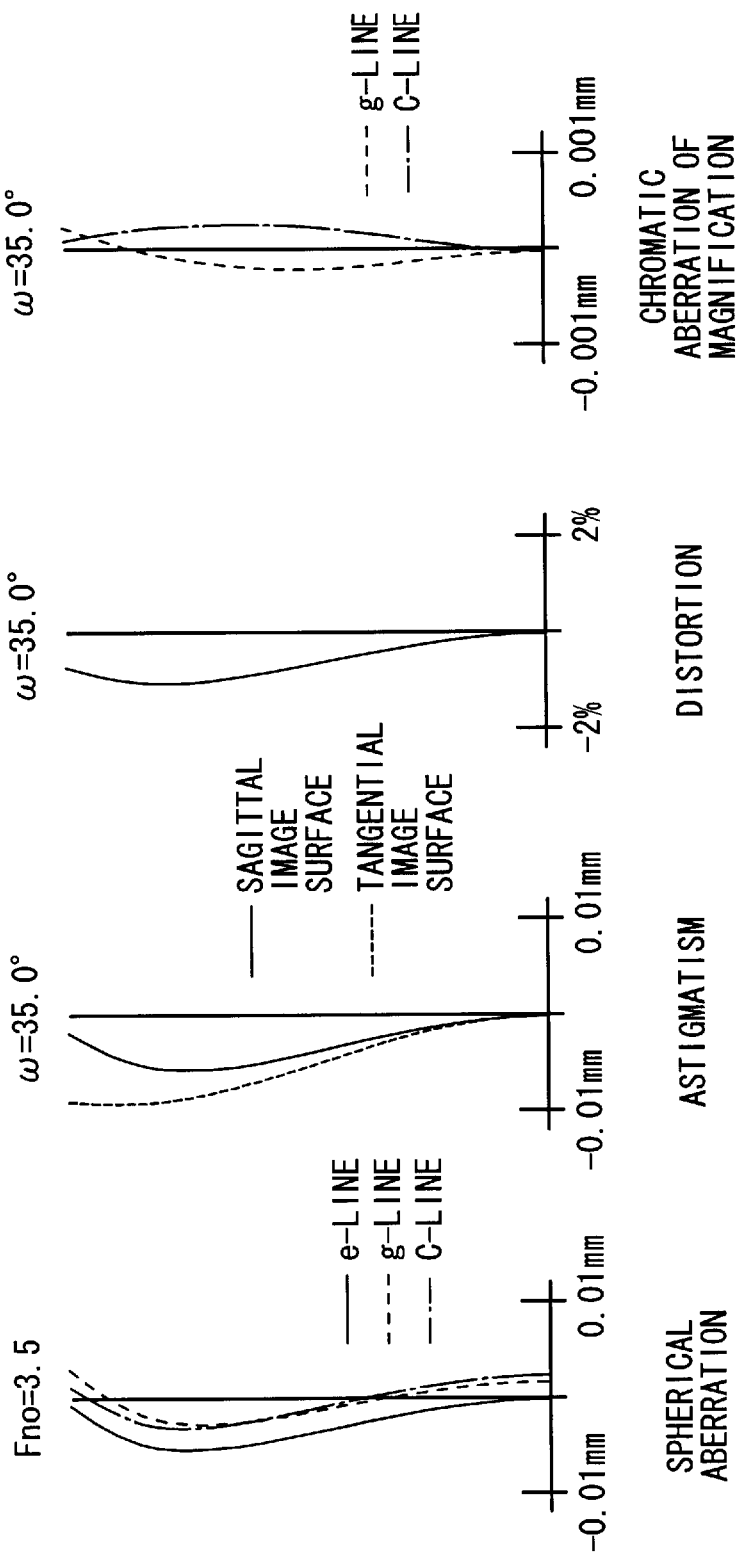

COMA (EXAMPLE 2)
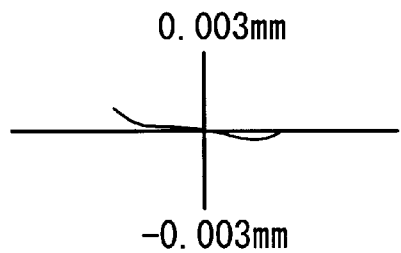
FIG. 13A  ω=35.0°
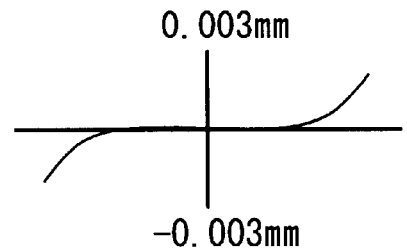
FIG. 13E
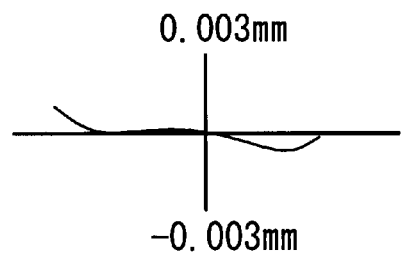
FIG. 13B  ω=26.2°
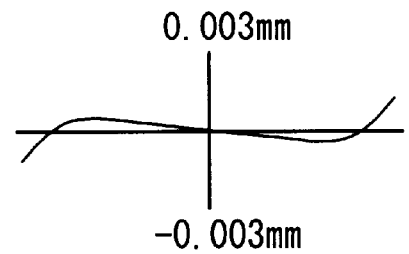
FIG. 13F
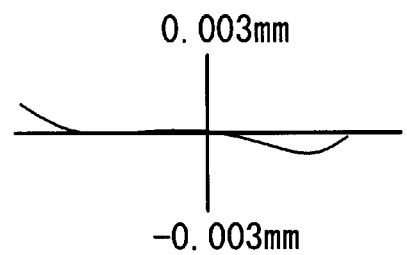
FIG. 13C  ω=19.3°
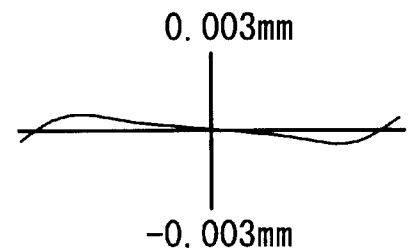
FIG. 13G
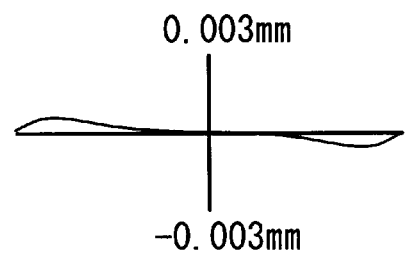
FIG. 13D  ω=0°

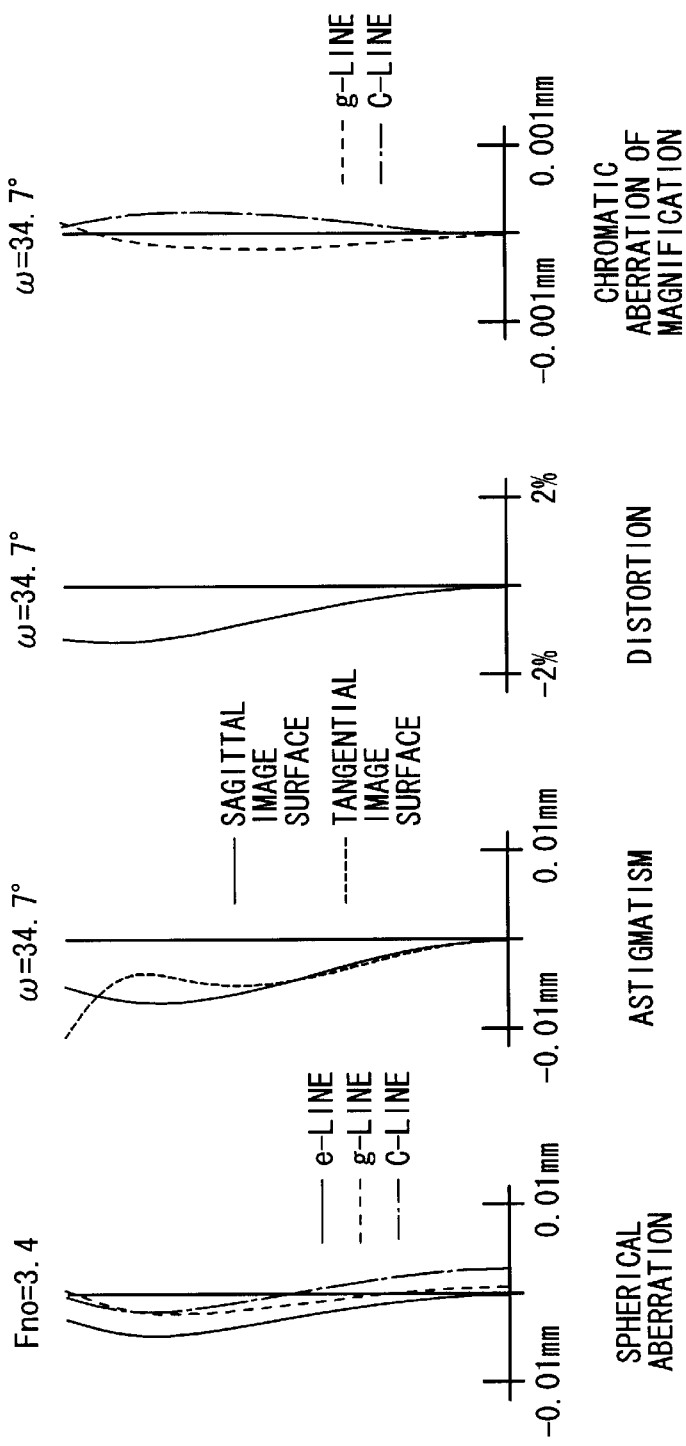

COMA (EXAMPLE 3)

ω=34.7°

ω=25.8°

ω=19.0°

ω=0°

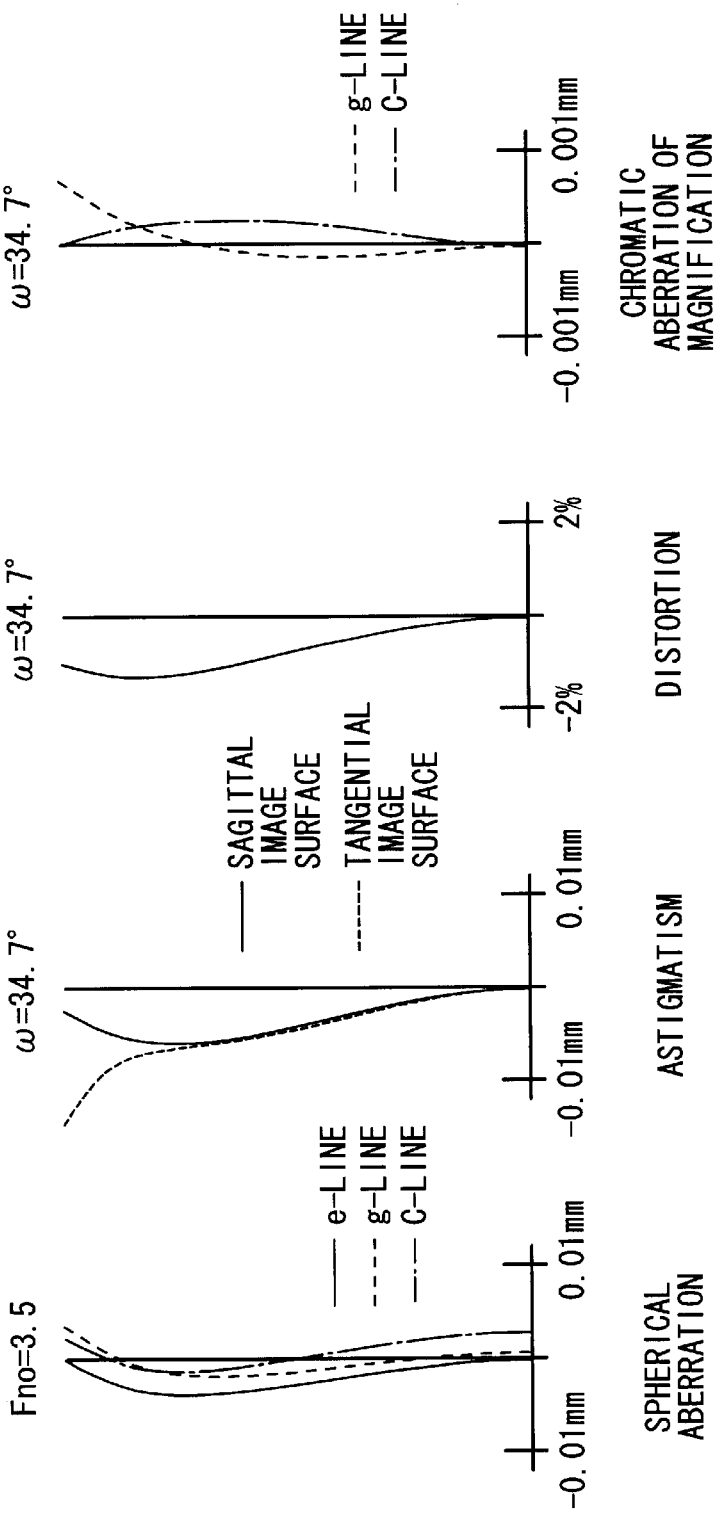

COMA (EXAMPLE 4)

| EXAMPLE 5 · LENS DATA ||||||
| --- | --- | --- | --- | --- | --- |
| | Si (SURFACE No.) | Ri (RADIUS OF CURVATURE) | Di (SURFACE SEPARATION) | Ndj (REFRACTIVE INDEX) | $\nu dj$ (ABBE No.) |
| G1A | 1 | 1.1012 | 0.0515 | 1.71300 | 53.9 |
| G1A | 2 | 0.5734 | 0.1687 | | |
| G1A | 3 | 1.6538 | 0.0444 | 1.48749 | 70.2 |
| G1A | 4 | 0.5344 | 0.2069 | | |
| G1B | 5 | 1.6587 | 0.3632 | 1.80400 | 46.6 |
| G1B | 6 | -0.6716 | 0.0408 | 1.60342 | 38.0 |
| G1B | 7 | -4.3261 | 0.2108 | | |
| G1B | 8 | -0.7914 | 0.0708 | 1.62041 | 60.3 |
| G1B | 9 | -0.6104 | 0.0606 | 1.00000 | |
| | fc | — | 0.1535 | | |
| | Stop | — | 0.2364 | | |
| | fc | — | 0.0101 | | |
| G2 | 10 | -27.7186 | 0.0727 | 1.77250 | 49.6 |
| G2 | 11 | -0.8229 | 0.0153 | | |
| G2 | 12 | -0.5710 | 0.1657 | 1.66680 | 33.1 |
| G2 | 13 | 2.9620 | 0.0502 | | |
| G2 | 14 | -1.4628 | 0.1010 | 1.48749 | 70.2 |
| G2 | 15 | -0.6191 | 0.0061 | | |
| G2 | 16 | -7.1861 | 0.0970 | 1.48749 | 70.2 |
| G2 | 17 | -0.9732 | 1.2737 | | |

( f=1.0, Fno=3.5, 2ω=70.7° )

FIG. 19

| EXAMPLE | VALUES CORRESPONDING TO CONDITIONAL EXPRESSIONS ||||||
| | (1) f1a/f1b | (2) f1/f | (4) f1/f2 | (5) $\nu$2-i || (6) f5/f1a |
| | | | | $\nu$2-3 | $\nu$2-4 | |
| 5 | −0.82 | 2.28 | 1.18 | 70.20 | 70.20 | −4.65 |

FIG. 20

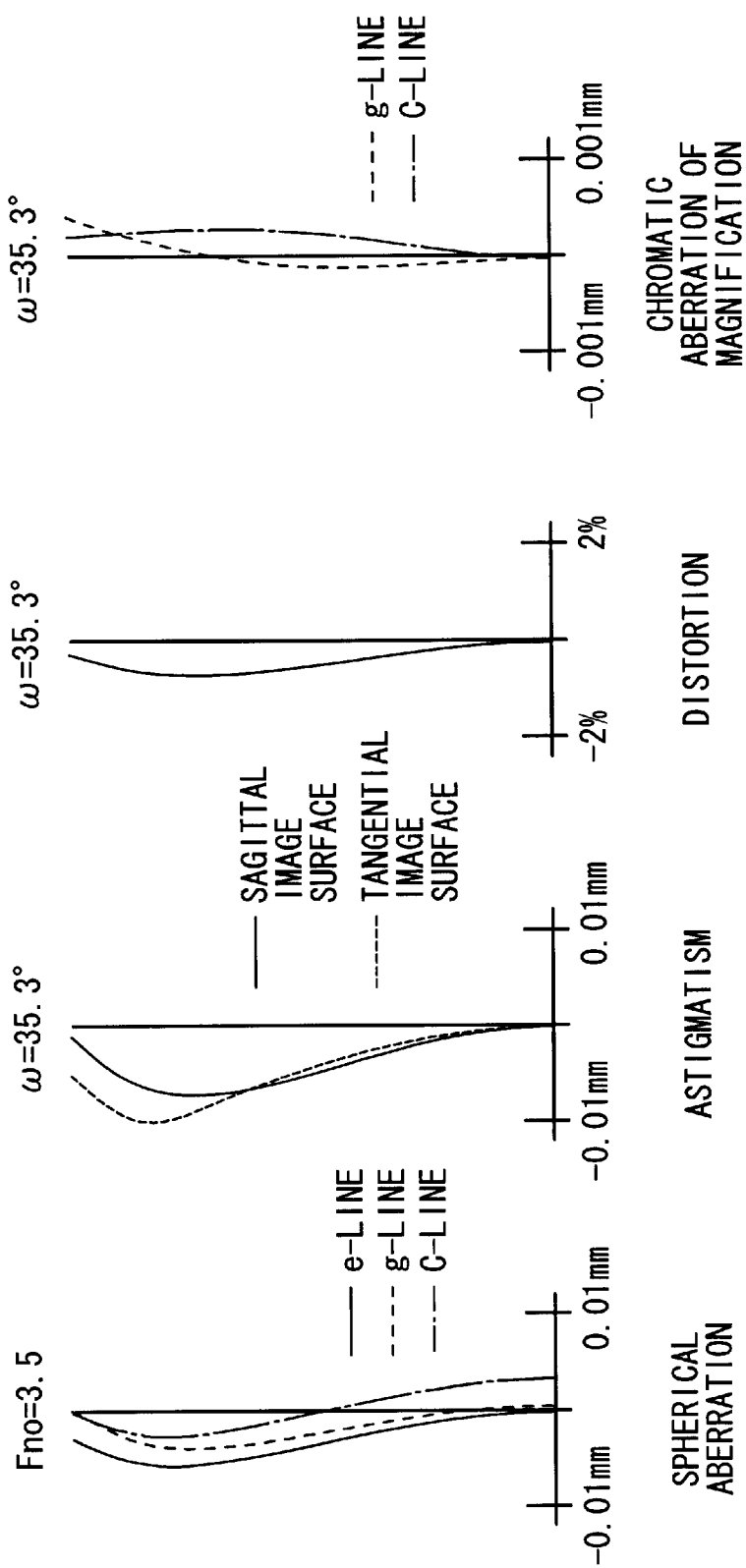

COMA (EXAMPLE 5)
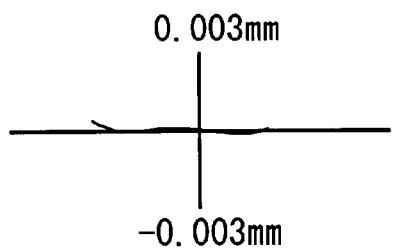
FIG. 22A  ω=35.3°
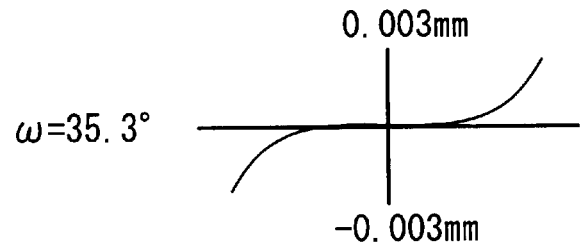
FIG. 22E
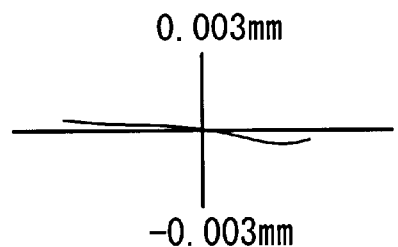
FIG. 22B  ω=26.5°
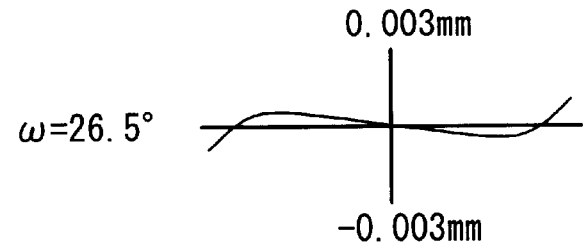
FIG. 22F
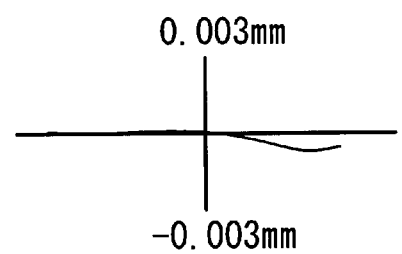
FIG. 22C  ω=19.6°
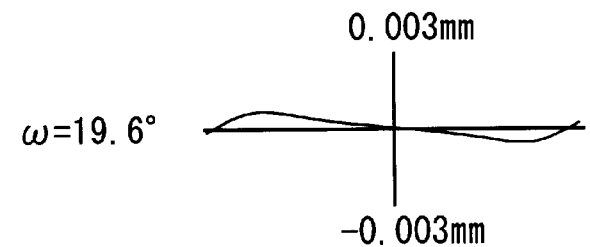
FIG. 22G
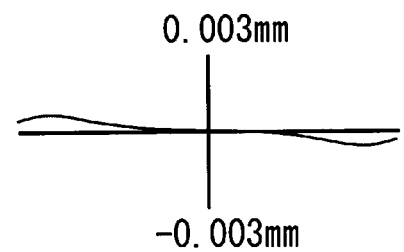
FIG. 22D  ω=0°

RETROFOCUS IMAGING LENS

BACKGROUND OF THE INVENTION

1. Field of the Invention

The present invention relates to a retrofocus imaging lens suitable for, for example, a 35 mm camera, a medium-format camera, a video camera, and the like. More particularly, the invention relates to a retrofocus imaging lens of a rear focus system for achieving focus by moving a part, particularly, a rear-side lens group of a lens system.

2. Description of the Related Art

Conventionally, as an imaging lens of a wide angle of view having backfocus longer than a focal length, a retrofocus imaging lens is known. The retrofocus imaging lens is generally constructed by disposing, in order from an object side, a negative lens group and a positive lens group and the principal point is behind the whole lens system.

In a lens of this kind, by disposing a lens having a strong negative refractive power on the front side, an image can be captured to a wide angle of view, and a peripheral light amount can be increased. However, on the other hand, the lens has a drawback such that a large negative distortion is caused.

A retrofocus imaging lens has, generally, an asymmetric lens configuration as a whole in which a lens group having a negative refractive power is disposed in the front part and a lens group having a positive refractive power is disposed in the rear part, so that an amount of occurrence of various aberrations such as spherical aberration, comatic aberration, distortion, and astigmatism is large. There is a problem such that it is difficult to satisfactorily correct the various aberrations in total. Further, in the retrofocus imaging lens, in order to widen the angle of view of imaging while maintaining long backfocus, the negative refractive power on the front side has to be enhanced. In this case, to correct various aberrations which occur accordingly, the number of lenses increases. As a result, problems such as increase in the size of lenses, increase in cost, and occurrence of ghost which is hazardous to imaging occur.

In order to solve occurrence of the negative distortion, it is sufficient to use a negative lens having a high refractive index as the negative lens in the front-side negative lens group. However, a glass material with a high refractive index causes large dispersion, so that a chromatic aberration of negative magnification easily occurs. In the retrofocus imaging lens, by assuring a sufficient airspace between the negative front group and the positive rear group, a clear difference can be created between an incident height of an axial ray and that of an off-axis ray in each lens surface. The retrofocus imaging lens has therefore an element that the flexibility in aberration correction is increased. However, clear separation between the front and rear groups causes increase in the size of the whole system and increase in the diameter of the front lens.

Examples of conventional retrofocus wide-angle lenses are disclosed in Japanese Unexamined Patent Application Publication Nos. Sho 62-35089 and Hei 9-113800. Each of the lenses disclosed in the publications has front and rear lens groups sandwiching a stop. The converging action of the rear-side lens group is stronger than that of the front-side lens group, and a negative distortion is not fully corrected.

As a focusing method of a retrofocus imaging lens, a rear focus system of moving a rear group in a lens system can be considered. Generally, an amount of extending a focus lens group (hereinbelow, simply called a "focus group") in the lens of the rear focus system is smaller as compared with an overall focus system in which the whole lens is extended. The focus group is relatively small and light and focus can be achieved with a small driving force, so that the rear focus type lens is suitable for a camera having an automatic focus detecting device, or the like. Although there are such advantages, the rear focus type lens has a problem such that aberrations fluctuate when the focus group is moved more as compared with the overall focus system and it is therefore difficult to satisfactorily correct the aberrations throughout an object distance.

Conventional rear focus type lenses are disclosed not only in Japanese Unexamined Patent Application Publication No. Hei 9-11380 but also Japanese Unexamined Patent Application Publication Nos. Sho 59-216114 and Sho 61-140910. Each of the lenses disclosed in the publications has a configuration that relative importance is placed on the focus group in comparison with the lens overall length and the total number of lenses, which is not preferable from the viewpoint of driving at the time of focusing. Particularly, in the case of using the lens in a camera having a large image size such as a medium-format camera, the size and weight are increased and, in addition, the load on the driving system becomes heavy, so that it is not preferable. Japanese Unexamined Patent Application Publication No. Hei 5-119254 discloses a technique of achieving focus only by the rear side of a stop. According to the technique, however, the focusing mechanism is complicated and the number of lenses is large. Techniques enabling focus to be achieved only by moving a part of lenses for the purpose of improving drivability are also disclosed in Japanese Unexamined Patent Application Publication Nos. Sho 55-147607 and Sho 58-202414 and the like. These techniques disclosed in the publications have a problem such that correction of aberrations only by a focus group is not sufficient, and the aberrations fluctuate largely due to movement of the focus group.

In the case of using a lens shutter in any of the above-described lenses in the publications, there is no space to dispose a mechanism for the lens shutter around the position of the stop. There is a problem such that when the space around the stop is sufficiently assured, the various aberrations cannot be satisfactorily corrected.

SUMMARY OF THE INVENTION

The present invention has been achieved in view of the above problems. Its first object is to provide a retrofocus imaging lens in which various aberrations such as a negative distortion are satisfactorily corrected. A second object of the invention is to provide a retrofocus imaging lens having a space sufficient for using a lens shutter and, particularly, having a sufficient space from a mechanism viewpoint so that a focus group does not interfere with a lens shutter mechanism at the time of achieving focus in accordance with a rear focus system.

A retrofocus imaging lens according to a first aspect of the invention includes in order from an object side: a first lens group having a positive refractive power as a whole constructed by a front-side first lens group having a negative refractive power as a whole and a rear-side first lens group having a positive refractive power as a whole; and a second lens group having a positive refractive power as a whole. Each of the front-side first lens group and the rear-side first lens group includes one or more positive lens and two negative lenses. The second lens group includes, basically, one or more positive lens and one or more negative lens. Further, a conditional expression (1) is satisfied.

$$-1.25 < f_{1a}/f_{1b} < -0.75 \tag{1}$$

where $f_{1a}$ denotes a focal length of the front-side first lens group, and $f_{1b}$ represents a focal length of the rear-side first lens group.

In the retrofocus imaging lens according to the first aspect of the invention with the basic configuration, desirably, the front-side first lens group is constructed of four lenses which are, in order from the object side, for example, a positive lens, two negative meniscus lenses each having a convex surface directed to the object side, and a positive lens, or constructed of three lenses which are, in order from the object side, two negative meniscus lenses each having a convex surface directed to the object side and a positive lens and, further, a conditional expression (3) is satisfied.

$$0.35 < f_n/f_{1a} < 0.65 \tag{3}$$

where $f_{1a}$ denotes a focal length of the front-side first lens group and $f_n$ denotes a synthetic focal length of the two negative meniscus lenses in the front-side first lens group.

In the retrofocus imaging lens according to the first aspect of the invention with the basic configuration, preferably, the rear-side first lens group is constructed of, in order from the object side, for example, a biconvex positive lens, a negative meniscus lens having a convex surface directed to the image side, and a negative lens having a concave surface directed to the image side, or constructed of, in order from the object side, a negative meniscus lens having a convex surface directed to the object side, a biconvex positive lens, and a negative lens having a concave surface directed to the image side. The two lens components from the object side may be separated or take the form of a cemented lens.

A retrofocus imaging lens according to a second aspect of the invention has, basically, in order from an object side: a first lens group having a positive refractive power as a whole constructed by a front-side first lens group having a negative refractive power as a whole and a rear-side first lens group having a positive refractive power as a whole; and a second lens group having a positive refractive power as a whole. The front-side first lens group includes two or more negative lenses, the rear-side first lens group includes one negative lens and two or more positive lenses, and the second lens group includes one or more positive lens and one or more negative lens. Further, the above-described conditional expression (1) is satisfied.

In the retrofocus imaging lens according to the second aspect of the invention with the above basic configuration, preferably, the front-side first lens group is constructed of, for example, two negative meniscus lenses each having a convex surface directed to the object side, and the rear-side first lens group is constructed of, in order from the object side, a biconvex positive lens, a negative meniscus lens having a convex surface directed to the image side, and a positive meniscus lens having a convex surface directed to the image side. Further, it is desirable that a conditional expression (6) is satisfied.

$$-5.5 < f_5/f_{1a} < -4.0 \tag{6}$$

where $f_5$ denotes a focal length of the fifth lens from the object side and $f_{1a}$ denotes a focal length of the front-side first lens group.

The retrofocus imaging lens according to the first and second aspects of the invention preferably further includes a rear focus mechanism for allowing the second lens group which functions as a focusing lens to travel toward the object along an optical axis, thereby allowing an image focal point position to remain unchanged even though a distance from the object changes from infinite to closest range, wherein a conditional expression (2) is satisfied.

$$2.0 < f_1/f < 6.0 \tag{2}$$

where $f_1$ denotes a focal length of the first lens group and $f$ represents an overall focal length of the retrofocus imaging lens.

The retrofocus imaging lens according to the first and second aspects of the invention with the basic configuration, preferably, further includes: an aperture stop disposed between the first and second lens groups; and a flare-cut aperture disposed between the aperture stop and the second lens group, the flare-cut aperture traveling together with the second lens group when focusing, thereby suppressing a comatic flare caused by a part of oblique incident light, the part being far from the optical axis.

In the retrofocus imaging lens according to the first and second aspects of the invention, preferably, the second lens group is constructed of, in order from the object side, for example, a positive lens having a convex surface directed to the image side, a negative lens having a concave surface directed to the object side, a positive meniscus lens having a convex surface directed to the image side, and a positive lens having a convex surface directed to the image side. Desirably, a conditional expression (4) is satisfied, and at least one of dispersions $v_{2-i}$ ($i=3$ or 4) satisfies a conditional expression (5)

$$1.0 < f_1/f_2 < 4.0 \tag{4}$$

$$60 < v_{2-i} \tag{5}$$

where $v_{2-i}$ denotes a dispersion for a d-line of light of the i-th lens from the object side in the second lens group.

In the retrofocus imaging lens according to the first and second aspects of the invention, with the above-described basic configuration, various aberrations such as negative distortion are satisfactorily corrected. Particularly, like the retrofocus imaging lens according to the first aspect, one or more positive lens is added to the negative front-side first lens group and the negative lens is added to the positive second lens group which is positioned on the rear side of the first lens group, thereby enabling negative distortion to be satisfactorily corrected.

In the basic configuration of the retrofocus imaging lens according to each of the aspects, by properly employing the desired configuration, more satisfactory aberration correction and the performance suitable for the rear focus system are obtained. Particularly, by satisfying the conditional expression (2) in the configuration of the rear focus system using the second lens group as a focus group, a relatively long focal length of the first lens group on the front side of the focus group can be obtained, and an outgoing light flux can be properly set close to an afocal state. Thus, fluctuations in aberrations when the focus group is moved are suppressed. At this time, the image formation magnification in the focus group increases, and the movement amount in focusing may be relatively small. In the case of using a lens shutter near the position of the stop since the movement amount at the time of focusing is small, a sufficient space can be assured from a mechanism viewpoint so that the focus group does not interfere with the lens shutter mechanism at the time of focusing.

Other and further objects, features and advantages of the invention will appear more fully from the following description.

BRIEF DESCRIPTION OF THE DRAWINGS

FIG. 5 is an explanatory diagram showing lens data as the first numerical example (Example 1) of the retrofocus imaging lens according to the first embodiment of the invention.

FIG. 6 is an explanatory diagram showing lens data as the second numerical example (Example 2) of the retrofocus imaging lens according to the first embodiment of the invention.

FIG. 7 is an explanatory diagram showing lens data as the third numerical example (Example 3) of the retrofocus imaging lens according to the first embodiment of the invention.

FIG. 8 is an explanatory diagram showing lens data as the fourth numerical example (Example 4) of the retrofocus imaging lens according to the first embodiment of the invention.

FIGS. 9A and 9B are explanatory diagrams showing conditional values and focusing amounts satisfied by the retrofocus imaging lenses of the examples in the first embodiment of the invention.

FIGS. 10A to 10D are aberration charts showing spherical aberration, astigmatism, distortion and chromatic aberration of magnification in the retrofocus imaging lens of Example 1.

FIGS. 11A to 11G are aberration charts showing comatic aberration in the retrofocus imaging lens of Example 1.

FIGS. 12A to 12D are aberration charts showing spherical aberration, astigmatism, distortion and chromatic aberration of magnification in the retrofocus imaging lens of Example 2.

FIGS. 13A to 13G are aberration charts showing comatic aberration in the retrofocus imaging lens of Example 2.

FIGS. 14A to 14D are aberration charts showing spherical aberration, astigmatism, distortion and chromatic aberration of magnification in the retrofocus imaging lens of Example 3.

FIGS. 16A to 16D are aberration charts showing spherical aberration, astigmatism, distortion and chromatic aberration of magnification in the retrofocus imaging lens of Example 4.

FIG. 19 is an explanatory diagram showing lens data as the fifth numerical example (Example 5) of the retrofocus imaging lens according to the second embodiment of the invention.

FIG. 20 is an explanatory diagram showing conditional values satisfied by the retrofocus imaging lenses of the example in the second embodiment of the invention.

FIGS. 21A to 21D are aberration charts showing spherical aberration, astigmatism, distortion and chromatic aberration of magnification in the retrofocus imaging lens of Example 5.

FIGS. 22A to 22G are aberration charts showing comatic aberration in the retrofocus imaging lens of Example 5.

DETAILED DESCRIPTION OF THE PREFERRED EMBODIMENTS

Embodiments of the present invention will be described in detail below with reference to the drawings.

First Embodiment

Figure 1:
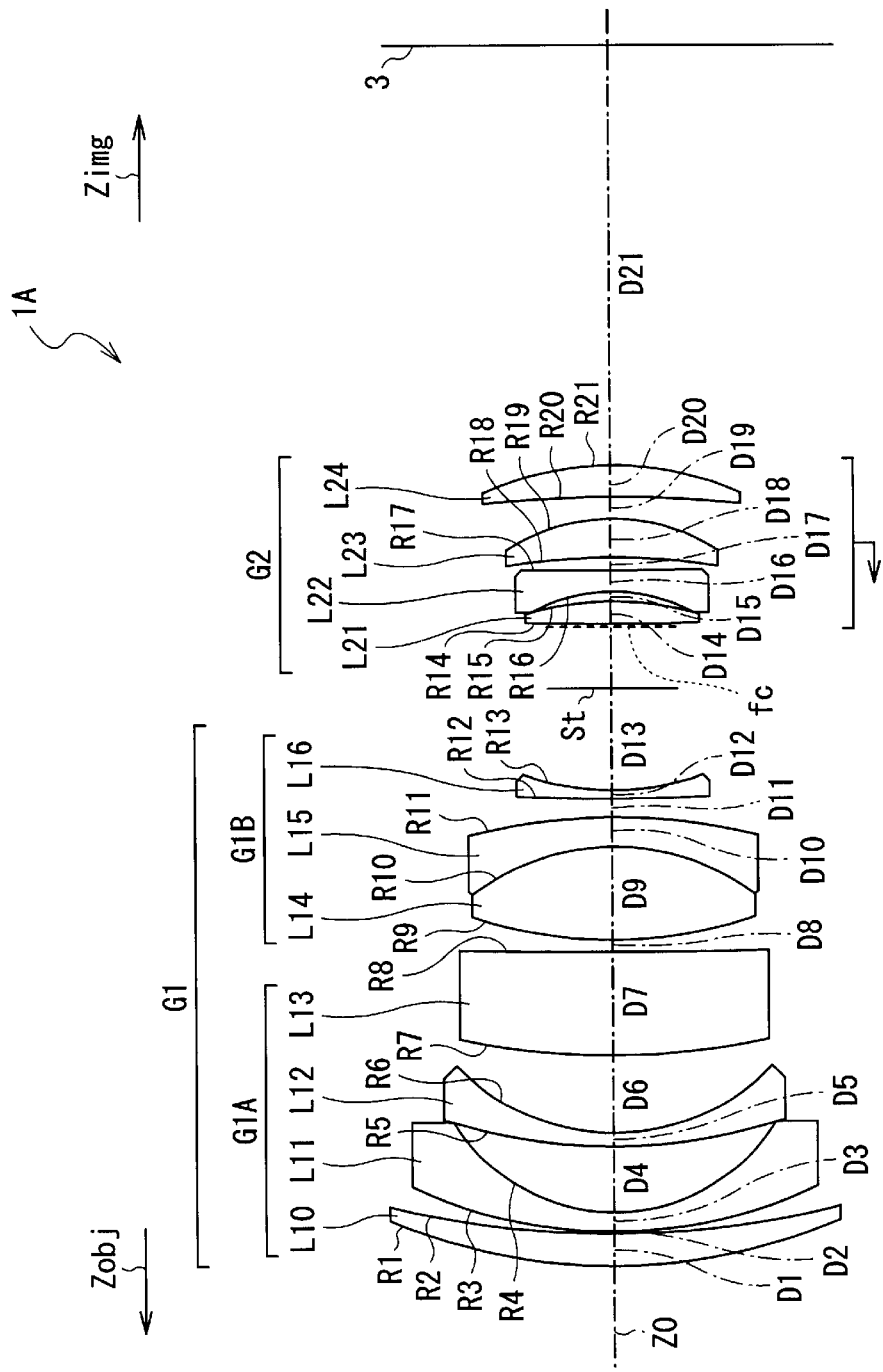
FIG. 1 is a cross section showing an example of the configuration of a retrofocus imaging lens according to a first embodiment of the invention, which corresponds to a first numerical example.
Figure 2:
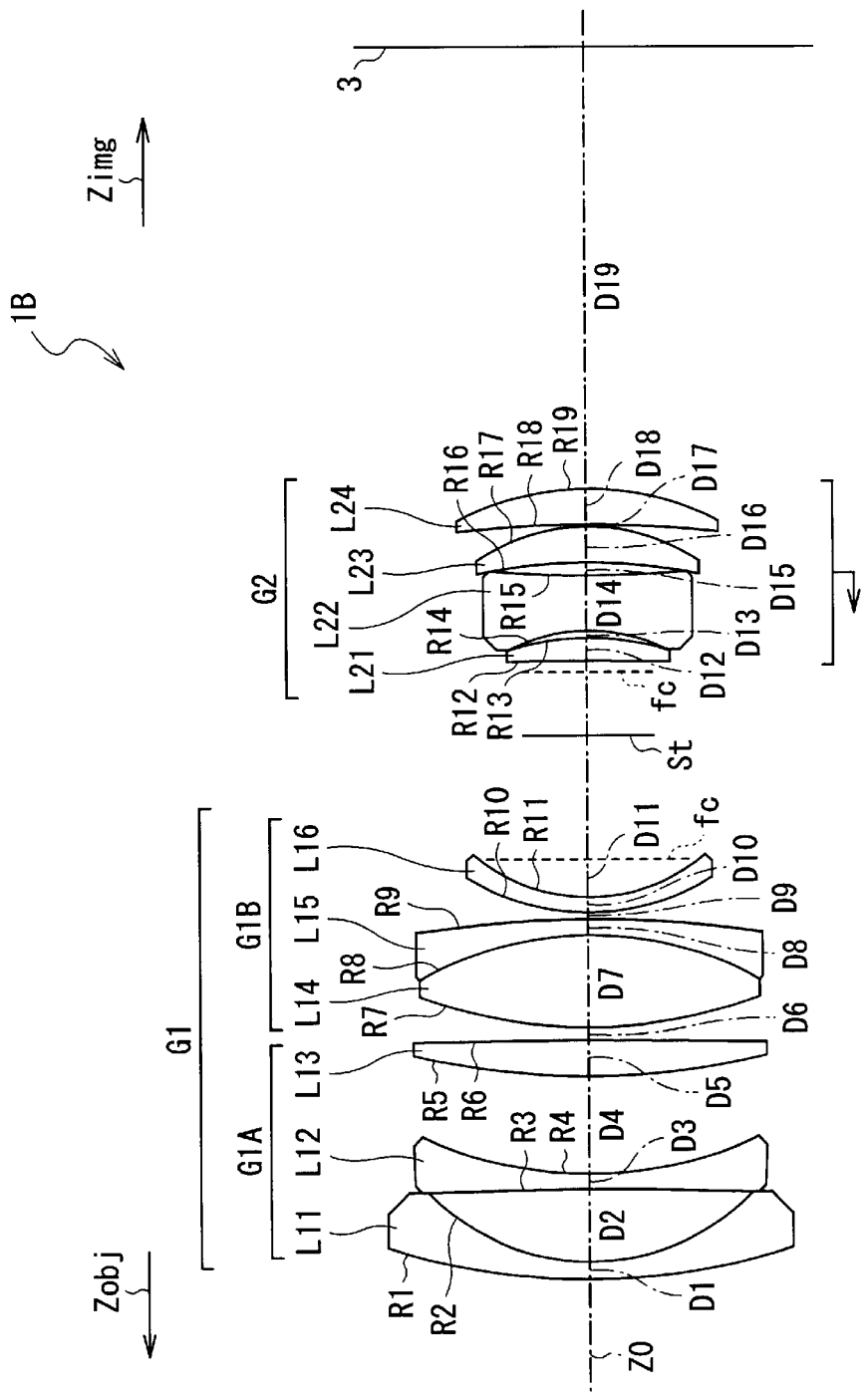
FIG. 2 is a cross section showing another example of the configuration of the retrofocus imaging lens according to the first embodiment of the invention, which corresponds to a second numerical example.
Figure 3:
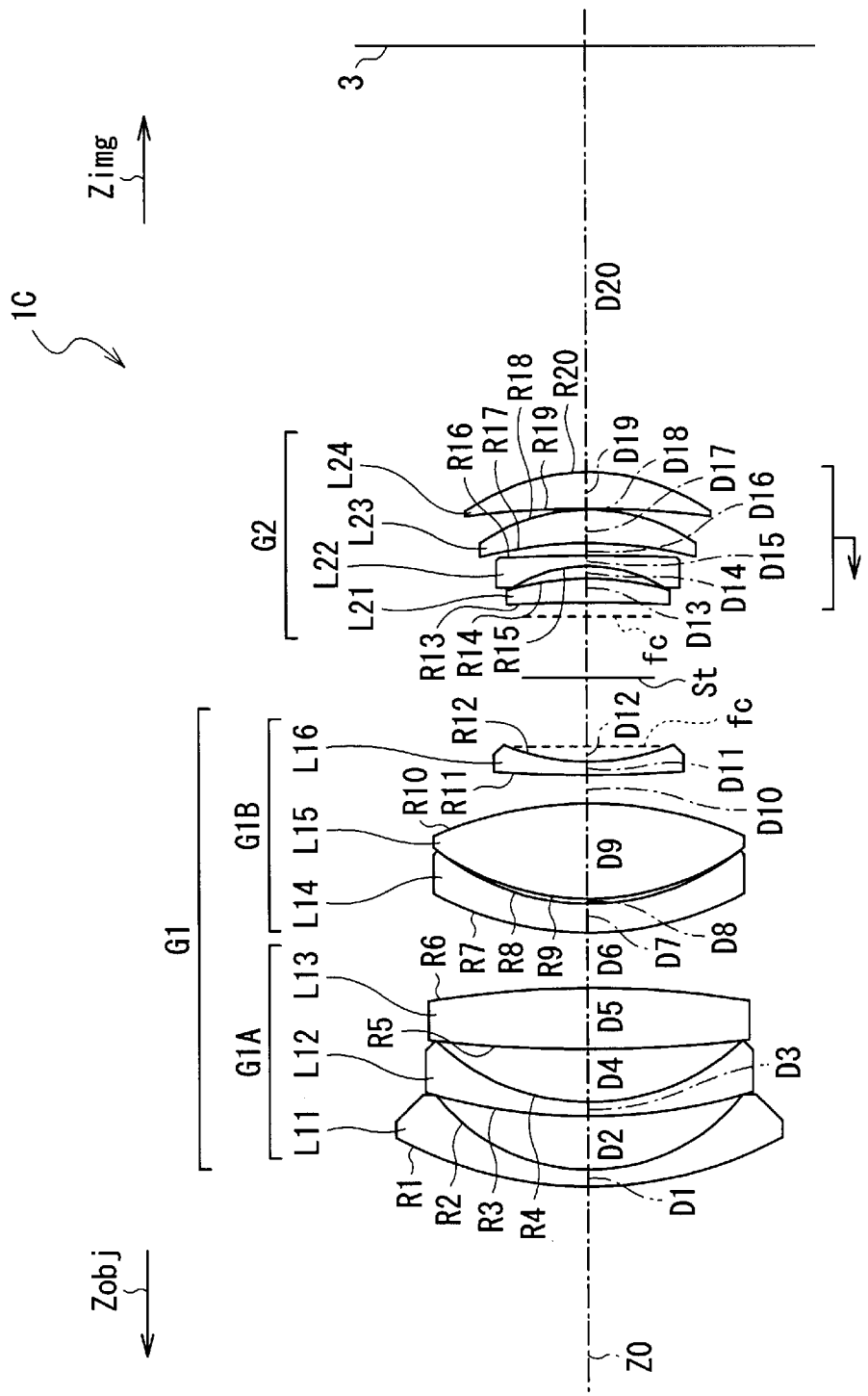
FIG. 3 is a cross section showing another example of the configuration of the retrofocus imaging lens according to the first embodiment of the invention, which corresponds to a third numerical example.
Figure 4:
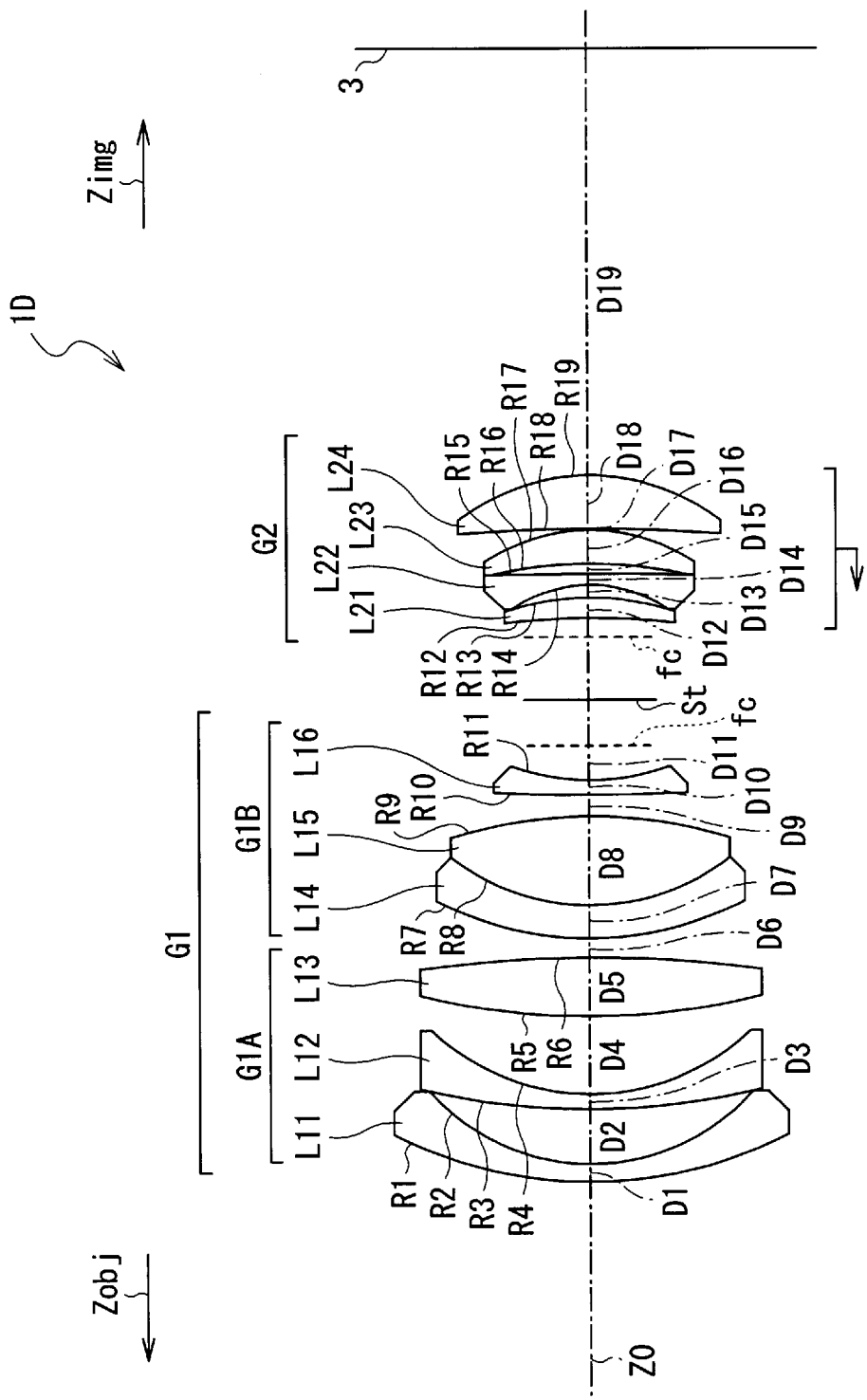
FIG. 4 is a cross section showing another example of the configuration of the retrofocus imaging lens according to the first embodiment of the invention, which corresponds to a fourth numerical example.
Figure 15A:
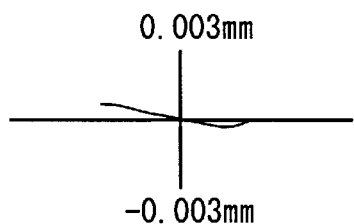
FIGS. 15A to 15G are aberration charts showing comatic aberration in the retrofocus imaging lens of Example 3.
Figure 15E:
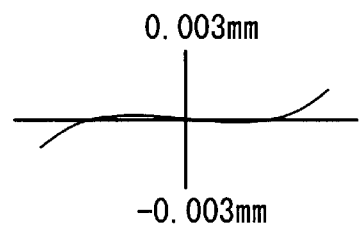
Figure 15B:
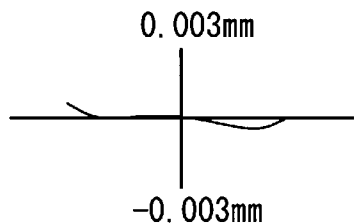
Figure 15F:
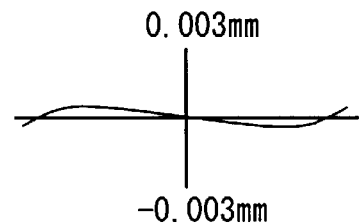
Figure 15C:
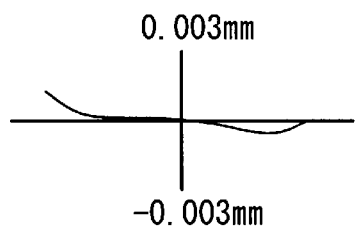
Figure 15G:
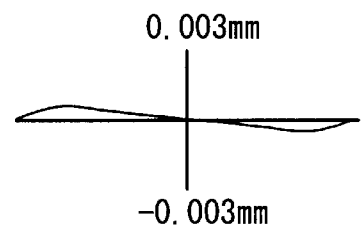
Figure 15D:
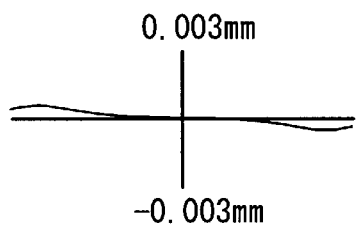
Figure 17A:
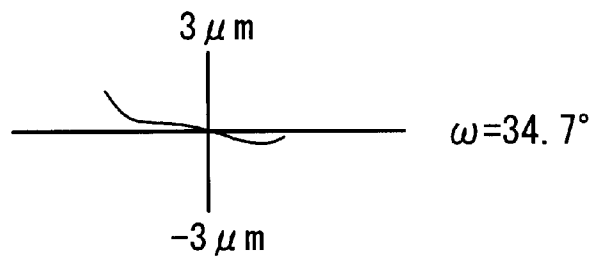
FIGS. 17A to 17G are aberration charts showing comatic aberration in the retrofocus imaging lens of Example 4.
Figure 17E:
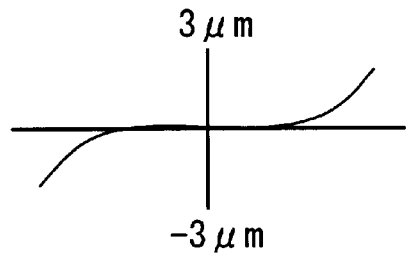
Figure 17B:
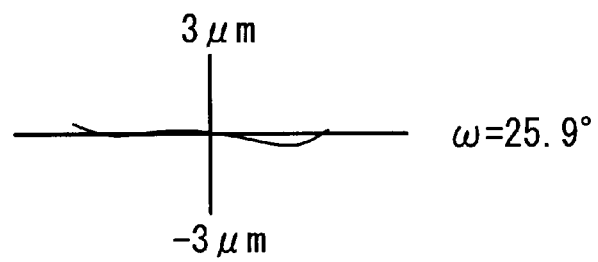
Figure 17F:
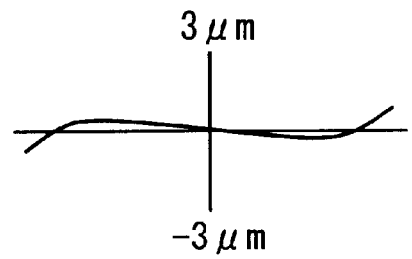
Figure 17C:
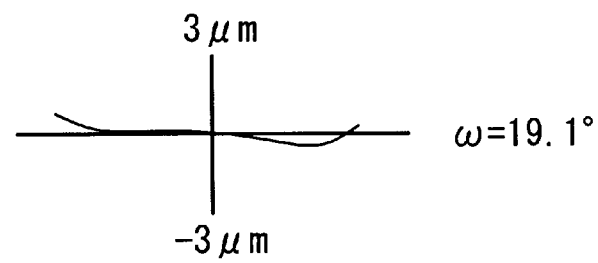
Figure 17G:
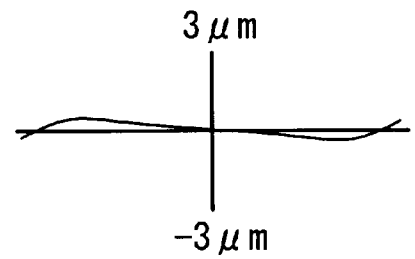
Figure 17D:
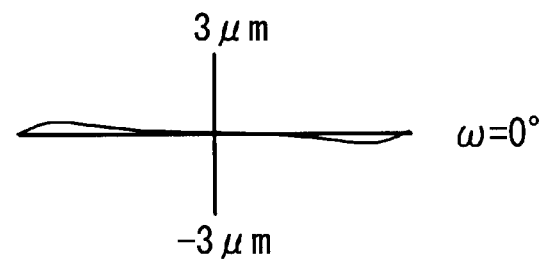

FIG. 1 shows an example of the configuration of a retrofocus imaging lens (hereinbelow, also simply called an imaging lens) according to a first embodiment of the invention. FIGS. 2 to 4 show other examples of the configuration of the retrofocus imaging lens according to the first embodiment. The examples of the configuration shown in FIGS. 1 to 4 correspond to lens configurations of first to fourth numerical examples (FIGS. 5 to 8), respectively, which will be described later. In FIGS. 1 to 4, the side indicated by reference characters Zobj is the object side, that is, the side on which a subject to be imaged exists. The side represented by reference characters Zimg is an image formation side (image face side). Reference numeral 3 indicates an image forming face. In FIG. 1, Ri represents a radius of curvature of the i-th lens surface which increments toward the image side from the lens surface closes to the object side as the first lens surface. Reference characters Di represent an interval between the i-th lens surface and the (i+1)th lens surface on the optical axis. St indicates an aperture stop, and fc indicates a mounting position of a flare-cut aperture.

Each of retrofocus imaging lenses 1A to 1D (hereinbelow, 1A to 1D will be generically described as 1) according to the embodiment shown in FIGS. 1 to 4 is used for, for example, a 35 mm camera, a medium-format camera, a video camera, and the like. The retrofocus imaging lens 1 has, along an optical axis Z0, in order from the object side, a first lens group G1 and a second lens group G2. Between the first and second lens groups G1 and G2, the aperture stop St and the flare-cut aperture fc are provided.

The first lens group G1 has a positive refractive power as a whole. The first lens group G1 is basically constructed by disposing, in order from the object side, a front-side first lens group G1A having a negative refractive power as a whole and a rear-side first lens group G1B having a positive refractive power as a whole. Basically, as will be described later, each of the front-side and rear-side first lens groups G1A and G1B includes at least one positive lens and two negative lenses.

The second lens group G2 has a positive refractive power as a whole. The second lens group G2 is basically constructed by including one or more positive lens and one or more negative lens as will be described later.

The retrofocus imaging lens 1 is constructed so as to satisfy the following conditional expression (1). In the expression, $f_{1a}$ denotes a focal length of the front-side first lens group G1A, and $f_{1b}$ indicates a focal length of the rear-side first lens group G1B.

$$-1.25 < f_{1a}/f_{1b} < -0.75 \qquad (1)$$

The retrofocus imaging lens 1 has a focusing mechanism (not shown) of the rear focus type using the second lens group G2 as a focus group. Specifically, the retrofocus imaging lens 1 is constructed in such a manner that, by the rear focus type focusing mechanism, the second lens group G2 is moved on the optical axis Z0 to the object side as the object point shifts from the infinite-point to the closest point, thereby maintaining the image focal point to be constant.

When the rear focus type focusing mechanism is employed, desirably, the following conditional expression is satisfied. In the expression, $f_1$ denotes a focal length of the first lens group G1, and f indicates a focal length of the whole lens system.

$$2.0 < f_1/f < 6.0 \quad (2)$$

The flare-cut aperture fc is disposed at least between the aperture stop St and the second lens group G2. The flare-cut aperture fc disposed between the aperture stop St and the second lens group G2 has the function of traveling together with the second lens group G2 at the time of focusing and suppressing a comatic flare caused by an upper part of oblique incident light. Like the imaging lenses 1B to 1D shown in FIGS. 2 to 4, the flare-cut aperture fc may be also disposed between the first lens group G1 and the aperture stop St. By disposing the flare-cut aperture fc between the first lens group G1 and the aperture stop St, the function of suppressing a comatic flare caused by a lower part of oblique incident light can be provided. Hereinabove, the 'upper' means an upper-direction with respect to the optical axis in FIG. 1, and the 'lower' means a lower-direction with respect to the optical axis in FIG. 1.

The front-side first lens group G1A can have a configuration such that, like the example of the configuration shown in FIG. 1, for example, in order from the object side, four lenses L10 to L13 of a positive lens (L10), two negative meniscus lenses (L11 and L12) each having a convex surface directed to the object side, and a positive lens (L13) are disposed. The front-side first lens group G1A may have a configuration of three lenses like the imaging lenses 1B to 1D shown in FIGS. 2 to 4. In this case, like the imaging lenses 1C and 1D shown in FIGS. 3 and 4, it is desirable to dispose, in order from the object side, the three lenses L11 to L13 of the two negative meniscus lenses (L11 and L12) each having a convex surface directed to the object side and the positive lens (L13).

In the case of constructing the front-side first lens group G1A by the four lenses L10 to L13 or the three lenses L11 to L13 as described above, further, it is desirable that the following conditional expression (3) is satisfied. In the expression, $f_{1a}$ denotes a focal length of the front-side first lens group G1A, and $f_n$ denotes a synthetic focal length of the two neighboring negative meniscus lenses (L11 and L12) in the front-side first lens group G1A.

$$0.35 < f_n/f_{1a} < 0.65 \quad (3)$$

The rear-side first lens group G1B can have a configuration that, like the examples of the configuration shown in FIGS. 1 and 2, for example, in order from the object side, three lenses L14 to L16 of the biconvex positive lens (L14), the negative meniscus lens (L15) having a convex surface directed to the image side, and the negative lens (L16) having a concave surface directed to the image side are disposed. Like the imaging lenses 1C and 1D shown in FIGS. 3 and 4, the three lenses L14 to L16 of the rear-side first lens group G1B may be constructed by a negative meniscus lens having a convex surface directed to the object side, a positive biconvex lens, and a negative lens having a concave surface directed to the image side. In any of the configurations, in the rear-side first lens group G1B, the two lens components L14 and L15 from the object side may be separated or a cemented lens.

The second lens group G2 can be configured by disposing, for example, in order from the object side, the four lenses L21 to L24 of the positive lens (L21) having a convex surface directed to the image side, the negative lens (L22) having a concave surface directed to the object side, the positive meniscus lens (L23) having a convex surface directed to the image side, and the positive lens (L24) having a convex surface directed to the image side.

In the case of constructing the second lens group G2 by the four lenses L21 to L24 as described above, desirably, the following conditional expression (4) is satisfied, and at least one dispersion $v_{2-i}$ (i=3 or 4) satisfies the conditional expression (5). $v_{2-i}$ indicates the value of a dispersion for the line "d" of the i-th lens from the object side in the second lens group G2.

$$1.0 < f_1/f_2 < 4.0 \quad (4)$$

$$60 < v_{2-i} \quad (5)$$

Optical actions and effects of the retrofocus imaging lens 1 with the configuration as described above will now be described.

The general retrofocus lens having the configuration in which the negative lens group and the positive lens group are disposed in order from the object side has a characteristic such that, owing to its configuration, a large negative distortion occurs. The negative distortion can be corrected by applying a positive refracting power to a dispersion system of the front-side group and applying a negative refracting power into a convergence system of the rear-side group. In the embodiment, one or more positive lenses (L10 and L13 (FIG. 1) or only L13 (FIGS. 2 to 4)) is/are disposed in a dispersion system (front-side first lens group G1A) in the first lens group G1 and, further, the negative lens L22 is disposed in the second lens group G2 as a convergence system, thereby correcting the negative distortion.

In the embodiment, each of the two negative lenses L11 and L12 in the front-side first lens group G1A is formed in a meniscus shape having a convex surface directed to the object side (FIGS. 1, 3 and 4) or a shape close to the meniscus shape (FIG. 2) so that the oblique incident light having a large incident angle to a first lens surface does not have an extremely large incident angle or outgoing angle at each of the lens surfaces when it passes through the front-side first lens group G1A. The angle of the light flux is gradually changed to a direction parallel to the optical axis Z0, so that the light flux enters the positive lens L13 that is the closest to the image side in the front-side first lens group G1A. Accordingly, while reducing the diameter of lenses closer to object side than the positive lens L13, the positive lens L13 on the most image side of the front-side first lens group G1A does not have to have a excessively strong refracting power to lessen the negative distortion. The above configuration is also helpful to suppress increase in flare of a comatic aberration caused by the lower part of oblique incident light. In the embodiment, by satisfying the conditional expression (1) as will be described later, the lens configuration becomes advantageous to assure predetermined backfocus.

In the rear focus type lens, to achieve excellent performances at the time of obtaining focus throughout the range from the infinite-point to the closest distance, it is desirable that aberration correction is properly made independently in each group. In order to reduce fluctuations in aberrations which occur when the focus group is moved, the focal length of the group on the front side of the focus group is set to be relatively long, and an outgoing light flux is set reasonably close to an afocal state, thereby increasing the image formation magnification in the focus group and decreasing the movement amount in focusing. In the embodiment, the focal length $f_1$ of the first lens group G1 is set to be relatively long, and the outgoing light flux is brought reasonably close to an afocal state. In the embodiment, as will be described later, mainly, the conditional expression (2) contributes to suppression of the aberration fluctuation and the movement amount of the focus group (second lens group G2).

In the case of using a lens shutter near the position of the stop, if the movement amount of the second lens group G2 is too large at the time of focusing, it is not preferable since the second lens group G2 may interfere with a mechanism for the lens shutter. In the embodiment, the movement amount of the second lens group G2 at the time of focusing is set to be relatively small. Consequently, even in the case of using the lens shutter near the position of the stop, a sufficient space can be assured from a mechanism viewpoint.

In order to obtain excellent performances at the time of focusing, it is desirable that aberrations are corrected in the focus group independently. However, small aberration fluctuations due to movement of the focus group such as spherical aberration, curvature of field, distortion, and comatic aberration are preferably corrected not in each group but in the whole lens system since the number of lenses is not unnecessarily increased. That is, it is preferable to correct aberrations which cannot be corrected by the first lens group G1 on the front side of the focus group by the focus group in the direction of canceling off the aberrations. On the other hand, with respect to the chromatic aberration of magnification, it is desirable that the chromatic aberration of magnification is sufficiently corrected by each of the focus group and the first lens group G1 independently from the viewpoint of achieving high resolution. Consequently, even when the positive second lens group G2 disposed on the rear side is moved as the focus group to achieve focus, fluctuations in aberrations such as chromatic aberration can be suppressed as much as possible.

The conditional expression (1) is a condition for preferably correcting aberrations while maintaining sufficient backfocus. When the negative refracting power of the front-side first lens group G1A becomes relatively weaker below the lower limit of the conditional expression (1), sufficient backfocus cannot be assured. On the other hand, when the negative refracting power of the front-side first lens group G1A becomes too strong beyond the upper limit, the negative distortion cannot be sufficiently corrected. A burden of the aberration correction on the other lens group increases and it causes insufficient correction of other aberrations.

The conditional expression (2) is a condition for suppressing aberration fluctuations and the movement amount at the time of focusing. When the focal length $f_1$ of the first lens group G1 becomes shorter beyond the lower limit of the conditional expression (2), it is not preferable since the aberration fluctuations caused by movement of the second lens group G2 as a focus group increase, the image formation magnification of the second lens group G2 becomes low, and the movement amount at the time of focusing increases. On the other hand, when the focal length $f_1$ of the first lens group G1 becomes longer than the upper limit, although the aberration fluctuations can be suppressed, it is not preferable since the image formation magnification of the second lens group G2 becomes high, and high precision is required for focusing.

In the imaging lens 1 of the embodiment, to obtain high resolution, it is necessary to provide the flare-cut aperture fc for suppressing comatic flare caused by the upper part of oblique incident light between the aperture stop St and the second lens group G2 preferably within a range where the axial light flux is not influenced. Particularly, by traveling the flare-cut aperture fc together with the second lens group G2 at the time of focusing, coma caused by the upper part of oblique incident light which increases at the time of focusing to the closest distance can be suppressed, and deterioration in resolution and increase in the diameter of the second lens group G2 as the focus group can be prevented.

As described above, the coma flare caused by the upper part of oblique incident light can be suppressed by the flare-cut aperture fc disposed between the aperture stop St and the second lens G2. As a countermeasure against the coma flare caused by the lower part of oblique incident light, it is effective to dispose a flare-cut aperture for suppressing flare caused by the lower part of oblique incident light also in front of the aperture stop St (FIGS. 2 to 4) within the confines of causing no vignetting in the axial light flux. Particularly, in order to make the flare-cut aperture act effectively at the full angle of view, a flare-cut aperture fc for a coma flare caused by the lower part of oblique incident light is provided in a position close to the aperture stop St between the first lens group G1 and the aperture stop St. In this case, an spacer ring or the like may also serve as the flare-cut aperture fc. This case is advantageous from the viewpoint of cost more than the case of separately providing the flare-cut aperture fc.

The conditional expression (3) is a condition enabling satisfactory aberration correction to be made by regulating the refracting powers of the negative lenses (L11 and L12) and the positive lenses (L10 and L13 (FIG. 1) or only L13 (FIGS. 2 to 4)) in the front-side first lens group G1A to reasonable values. If the refracting power of the positive lens in the front-side first lens group G1A becomes too strong beyond the lower limit of the conditional expression (3), although correction of negative distortion becomes easier, it causes increase coma flare caused by the lower part of oblique incident light and excessive correction of a chromatic aberration of magnification. In addition, it becomes difficult to assure sufficient backfocus. On the other hand, if the negative refracting power of the front-side first lens group G1A becomes too strong beyond the upper limit, a negative distortion cannot be lessened in the front-side first lens group G1A. A burden on the other lens group increases and it causes insufficient correction of other aberrations.

The conditional expression (4) is a condition for correcting aberrations in total by the front and rear groups sandwiching the aperture stop St. Below the lower limit of the conditional expression (4), the second lens group G2 has an aberration of an equivalent size so as to cancel off the aberration which cannot bee corrected by the first lens group G1, so that aberration fluctuations due to focus movement increase. On the other hand, over the upper limit, various aberrations of the second lens group G2 have to be independently corrected to be satisfactory, so that the number of lenses increases.

The conditional expression (5) is a condition for suppressing fluctuations in the chromatic aberration of magnification at the time of focus movement. With respect to a predetermined lens component in the second lens group G2, it is desirable to select a glass material so as to satisfy the condition.

The above will be summarized as follows. In the retrofocus imaging lens 1 according to the embodiment, by employing the desired configuration as the basic configuration, while suppressing increase in the number of lenses, the size of the whole system, the size of lenses closer to object side, the cost, and the like, various aberrations such as negative distortion aberration can be satisfactorily corrected in total. At the time of obtaining focus, without increasing relative importance on the focus group as compared with the overall lens length or the total number of lenses, excellent optical performances can be obtained throughout the physical distance. A sufficient space for disposing the lens shutter mechanism is assured around the stop position.

As described above, in the retrofocus imaging lens 1 according to the embodiment, by properly employing the desired configuration as or in the basic configuration, various aberrations such as negative distortion can be satisfactorily corrected. Moreover, even when a lens shutter is used around the stop position, a sufficient space can be provided from a mechanism viewpoint so that the focus group does not interfere with the lens shutter mechanism at the time of focusing.

EXAMPLES 1 to 4

Concrete numerical examples of the retrofocus imaging lens 1 according to the embodiment will now be described. In the following, the first to fourth numerical examples (Examples 1 to 4) will be explained in a lump.

FIGS. 5 to 8 show lens data as concrete numerical examples corresponding to the retrofocus imaging lenses 1A to 1D shown in FIGS. 1 to 4. In the column of surface number Si in each of FIGS. 5 to 8, the sequence of the lens surfaces, incrementing toward the image side with the surface closest to the object side being a first lens surface of the lens in each example. "fc" expresses the flare-cut aperture fc, and "Stop" indicates the aperture stop St. In the column of the radius of curvature Ri, in correspondence with the reference characters Ri shown in each of FIGS. 1 to 4, the value of the radius of curvature of the i-th lens surface from the object side is shown. In the column of surface separation Di as well, in correspondence with the reference characters Di shown in each of FIGS. 1 to 4, surface separation on the optical axis between the i-th lens surface Si from the object side and the [i+1]th lens surface Si+1 is shown. The radius of curvature Ri and the surface separation Si are expressed in millimeters (mm). In the columns of Ndj and vdj, the refractive index and the Abbe number, respectively, of the j-th lens element from the object side for the d-line (wavelength $\lambda_d$=587.6 nm) are shown.

FIGS. 5 to 8 also show the values of focal length "f" of the whole lens system, F-number (Fno), and angle 2ω of view (ω denotes the half angle of view). Lens data of each of the examples is normalized so that the focal length "f" of the whole lens system becomes 1.0.

FIG. 9A shows values for the above-described conditional expressions ((1) to (5)) in regard to the examples. As understood from FIG. 9A, the values of all the examples are within the range of the conditional expressions.

FIG. 9B shows a movement amount (focusing amount) of the second lens group G2 at the time of focusing. FIG. 9B also shows the focusing amount in the example (Example 5) regarding a second embodiment to be described later. When the object position is moved from the infinite-point to the closest distance, only by the amount shown in FIG. 9B, the second lens group G2 is moved to the object side on the optical axis. The focusing amount shown in FIG. 9B is the value derived when the focal length "f" is normalized to 1.0 in a manner similar to the lens data. As understood from FIG. 9B, the focusing amount of the imaging lens in each of the examples is small, so that the possibility of interference with the mechanism for the lens shutter is low. It can be said the imaging lens is a lens having a sufficient space for disposing the mechanism for the lens shutter around the position of the stop.

FIGS. 10A to 10D to FIGS. 17A to 17G show various aberrations regarding lenses of the examples. More specifically, in FIGS. 10A, 12A, 14A, and 16A show spherical aberration, FIGS. 10B, 12B, 14B, and 16B show astigmatism, FIGS. 10C, 12C, 14C, and 16C show distortion, and FIGS. 10D, 12D, 14D, and 16D show chromatic aberration of magnification. In FIGS. 10B, 12B, 14B, and 16B, the solid line indicates aberration with respect to a sagittal image surface and the broken line denotes aberration with respect to a tangential (meridional) image surface. FIGS. 11A to 11D, FIGS. 13A to 13D, FIGS. 15A to 15D, and FIGS. 17A to 17D show coma aberration with respect to the tangential image surface. FIGS. 11E to 11G, FIGS. 13E to 13G, FIGS. 15E to 15G, and FIGS. 17E to 17G show coma aberration with respect to the sagittal image surface. Any of the aberration charts of FIGS. 10A to 10D to FIGS. 17A to 17G, which do not show the wavelength indicate aberration with respect to the e-line. The wavelengths of the g-line, e-line, and C-line are 435.8 nm, 546.1 nm, and 656.3 nm, respectively.

As described above, with respect to all the examples, various aberrations are satisfactorily corrected, and a sufficient space for using a lens shutter can be provided.

Second Embodiment

A second embodiment of the invention will now be described. In the following description, the same reference numerals are designated to lens elements having the same optical actions, disposed in substantially the same positions as those in the first embodiment, and their description will not be repeated.

Figure 18:
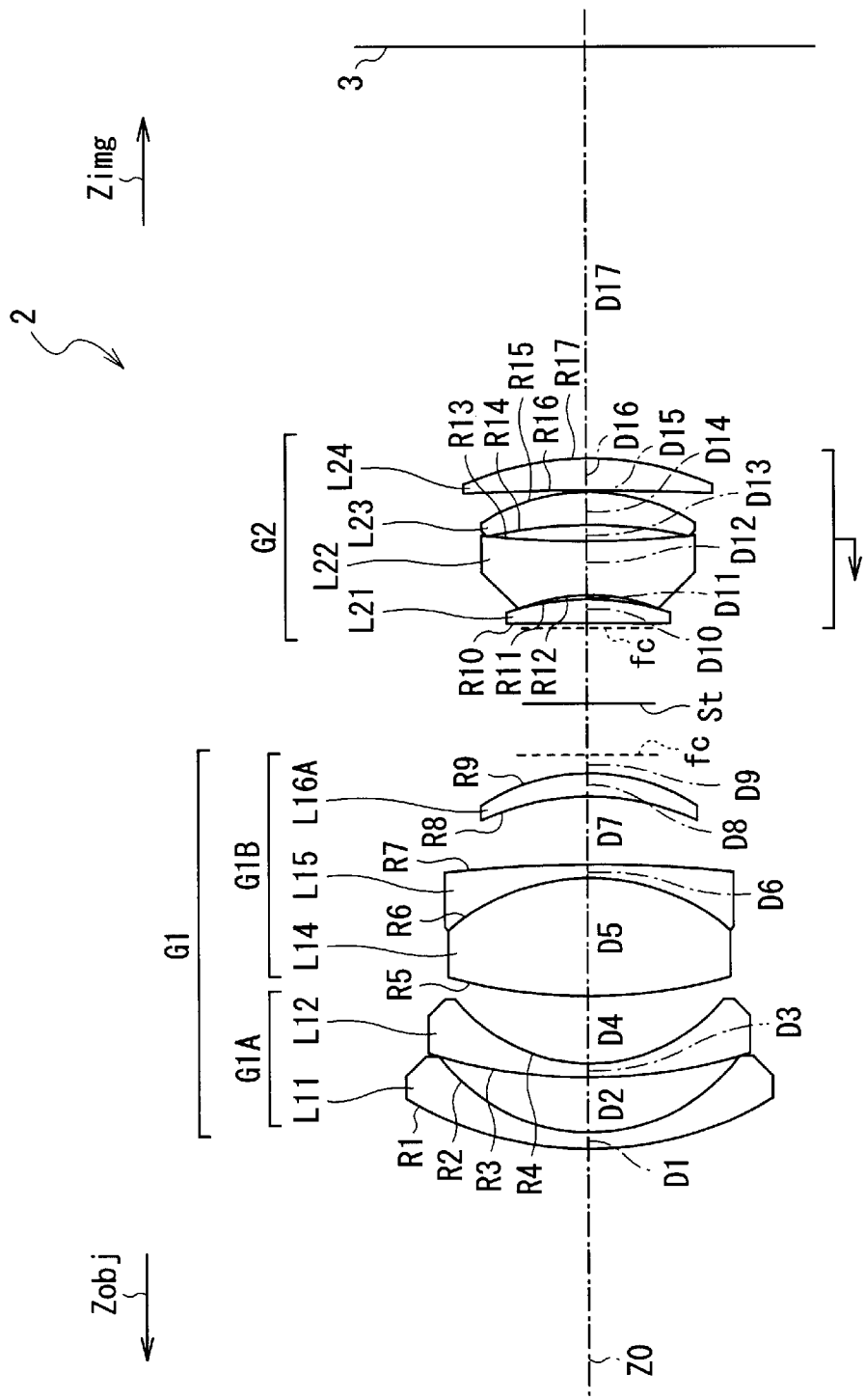
FIG. 18 is a cross section showing an example of the configuration of the retrofocus imaging lens according to a second embodiment of the invention, which corresponds to a fifth numerical example.

FIG. 18 shows an example of the configuration of a retrofocus imaging lens according to the second embodiment of the invention and corresponds to the lens configuration of an example with specific numerical values which will be described hereinlater. A retrofocus imaging lens 2 according to the second embodiment is constructed by including, in order from the object side, the first lens group G1 and the second lens group G2 in a manner similar to the imaging lens 1 according to the first embodiment shown in FIGS. 1 to 4. The first lens group G1 is, basically, constructed by disposing, in order from the object side, the front-side first lens group G1A having a negative refractive power as a whole and the rear-side first lens group G1B having a positive refractive power as a whole in a manner similar to the example of the configuration shown in FIGS. 1 to 4 and has a positive refractive power as a whole.

The retrofocus imaging lens 2 according to the embodiment is largely different from the example of the configuration shown in FIGS. 1 to 4 with respect to components of each of the front-side and rear-side first lens groups G1A and G1B. The front-side first lens group G1A in the embodiment is basically constructed by including two or more negative lenses. More concretely, as shown in FIG. 18, for example, it is desirable that the front-side first lens group G1A is constructed by two negative meniscus lenses L11 and L12 each having a convex surface directed toward the object side. The rear-side first lens group G1B in the embodiment is basically constructed by including one negative lens and two or more positive lenses. More concretely, as shown in FIG. 18, it is desirable that the rear-side first lens group G1B is constructed by disposing, for example, in order from the object side, three lenses L14, L15, and L16A of the biconvex positive lens (L14), the negative meniscus lens (L15) having a convex surface directed to the image side, and a positive meniscus lens (L16A) having a convex surface directed to the image side.

In the case where the front-side first lens group G1A is constructed by the two negative meniscus lenses L11 and L12 and the rear-side first lens group G1B is constructed by the three lenses L14, L15, and L16A, it is further desirable that the following conditional expression (6) is satisfied. In the expression, $f_5$ denotes a focal length of the fifth lens (L16A) from the object side, and $f_{1a}$ denotes a focal length of the front-side first lens group G1A.

$$-5.5 < f_5/f_{1a} < -4.0 \quad (6)$$

The second lens group G2 in the embodiment includes, in a manner similar to the example of the configuration shown in FIGS. 1 to 4, one or more positive lens and one or more negative lens and is basically constructed to have a positive refractive power as a whole. More concretely, in a manner similar to the examples of the configuration shown in FIGS. 1 to 4, the second lens group G2 is configured by disposing, for example, in order from the object side, the four lenses L21 to L24 of the positive lens (L21) having a convex surface directed to the image side, the negative lens (L22) having a concave surface directed to the object side, the positive meniscus lens (L23) having a convex surface directed to the image side, and the positive lens (L24) having a convex surface directed to the image side. It is further desirable that the second lens group G2 is constructed so as to satisfy the above-described conditional expressions (4) and (5).

The retrofocus imaging lens 2 according to the embodiment is also constructed so as to satisfy the conditional expression (1) in a manner similar to the examples of the configuration shown in FIGS. 1 to 4. In the embodiment as well, it is desirable that, by the focusing mechanism (not shown) of the rear focus type, the second lens group G2 moves toward the object side on the optical axis Z0 as the object point moves from the infinite-point to the closest distance so that the image focal point is maintained constant, and the conditional expression (2) is satisfied.

The flare-cut aperture fc is desirably disposed at least between the aperture stop St and the second lens group G2 in a manner similar to the examples of the configuration shown in FIGS. 1 to 4.

The optical actions and effects of the retrofocus imaging lens 2 having such a configuration will be described, particularly, with respect to the characteristic portion of the embodiment.

The configuration of the imaging lens 2 of the embodiment is simplified as compared with that of the imaging lens 1 in each of FIGS. 1 to 4 by providing the positive meniscus lens L16A positioned closest to the image side in the rear-side first lens group G1B with the action of the convex lens (L10, L13 (FIG. 1) or L13 (FIGS. 2 to 4)) of the front-side first lens group G1A in the imaging lens 1 in FIGS. 1 to 4. In the imaging lens 2 of the embodiment, the positive meniscus lens L16A is disposed so that its convex surface faces the image side. By allowing oblique incident ray to enter or go out from the positive meniscus lens surface at a large angle, negative distortion is satisfactorily corrected.

The conditional expression (6) is a condition for satisfactorily correcting various aberrations in the first lens group G1. When the negative refracting power of the front-side first lens group G1A becomes too strong beyond the lower limit of the conditional expression (6), although sufficient backfocus can be assured, negative distortion increases. On the other hand, when the positive refracting power of the fifth lens L16A from the object side in the first lens group G1 becomes too strong over the upper limit, although the negative distortion can be easily corrected, increase in coma flare caused by the lower part of oblique incident light and excessive correction of chromatic aberration of magnification are caused.

As described above, in the retrofocus imaging lens 2 according to the embodiment, by employing the desired configuration as the basic configuration, while making the configuration simpler as compared with that of the imaging lens 1 in each of FIGS. 1 to 4, optical performances similar to those of the imaging lens 1 can be obtained.

FIFTH EXAMPLE

An example of the retrofocus imaging lens 2 of the embodiment with specific numerical values will be described hereinbelow.

FIG. 19 shows lens data as an example (Example 5) with specific numerical values of the retrofocus imaging lens 2 shown in FIG. 18. Numerical values in FIG. 19 are similar to lens data (FIGS. 5 to 8) of the first to fourth examples.

FIG. 20 shows values corresponding to the conditions of the above-described conditional expressions ((1) and (2) and (4) to (6)) in regard to the example. As shown here, all the values of the example are within the range of the conditional expressions.

The movement amount (focusing amount) of the second lens group G2 in the example is as shown in FIG. 9B. Since the focusing amount is small also in the imaging lens of the example, the possibility of interference between the second lens group and the lens shutter mechanism while focusing from the infinite to closest range is low. It can be therefore said that the imaging lens is a lens having a sufficient space for disposing the mechanism for the lens shutter around the position of the stop.

FIGS. 21A to 21D and FIGS. 22A to 22G show various aberrations regarding lenses of the examples. More specifically, FIG. 21A shows spherical aberration, FIG. 21B shows astigmatism, FIG. 21C shows distortion, and FIG. 21D shows chromatic aberration of magnification. FIGS. 22A to 22D show comatic aberration with respect to a tangential image surface, and FIGS. 22E to 22G show comatic aberration with respect to a sagittal image surface.

As described above, with respect to all the examples, various aberrations are satisfactorily corrected, and a sufficient space for using a lens shutter can be provided.

The invention is not limited to the above embodiments and examples but can be variously modified. For example, the radius of curvature R, surface separation D, refractive index N, Abbe number v, and the like of each lens component are not limited to the values shown in the examples but may take other values.

As described above, according to one aspect of the invention, the retrofocus imaging lens includes in order from an object side: the first lens group having a positive refractive power as a whole constructed by the front-side first lens group having a negative refractive power as a whole and the rear-side first lens group having a positive refractive power as a whole; and the second lens group having a positive refractive power as a whole. Each of the front-side first lens group and the rear-side first lens group includes one or more positive lens and two negative lenses. The second lens group includes, basically, one or more positive lens and one or more negative lens. Further, with respect to the focal length of the front-side first lens group and the focal length of the rear-side first lens group, the predetermined conditional expression (1) is satisfied. Consequently, various aberrations can be satisfactorily corrected. Particularly, one or more positive lens is added to the negative front-side first lens group and the negative lens is added to the positive second lens group which is positioned on the rear side of the first lens group, thereby enabling negative distortion to be satisfactorily corrected.

According to the second aspect of the invention, the retrofocus imaging lens has, in order from an object side: the first lens group having a positive refractive power as a whole constructed by the front-side first lens group having a negative refractive power as a whole and the rear-side first lens group having a positive refractive power as a whole; and the second lens group having a positive refractive power as a whole. The front-side first lens group includes two or more negative lenses, the rear-side first lens group includes one negative lens and two or more positive lenses, and the second lens group includes one or more positive lens and one or more negative lens. Further, with respect to the focal length of the front-side first lens group and that of the rear-side first lens group, the predetermined conditional expression (1) is satisfied. Thus, various aberrations such as negative distortion can be satisfactorily corrected.

Particularly, the retrofocus imaging lens according to the first and second aspects of the invention has a rear focus mechanism for allowing the second lens group which functions as a focusing lens to travel toward the object along an optical axis, thereby allowing an image focal point position to remain unchanged even though a distance from the object changes from infinite to closest range, with respect to the focal length of the first lens group and that of the whole system, the predetermined conditional expression (2) is satisfied. Consequently, fluctuations in aberrations and the movement amount at the time of focusing can be suppressed. Thus, sufficient space for using a lens shutter can be provided. Specifically, sufficient space in a mechanism viewpoint can be provided so that the focus group does not interfere with the lens shutter mechanism also at the time of focusing according to the rear focus system.

The retrofocus imaging lens according to the first and second aspects of the invention further includes the flare-cut aperture disposed between the aperture stop and the second lens group, the flare-cut aperture traveling together with the second lens group when focusing, thereby suppressing a comatic flare caused by the upper part of oblique incident light. Thus, the comatic flare caused by the upper part of oblique incident light increasing at the time of focusing to the closest point is suppressed, and deterioration in resolution and increase in the diameter of the second lens group as the focus group can be prevented.

Further, in the retrofocus imaging lens according to the first and second aspects of the invention, particularly with respect to the dispersion $v_{2-i}$ of the i-th lens from the object side in the second lens group satisfies the predetermined conditional expression (5). Therefore, fluctuations in chromatic aberration of magnification at the time of movement for obtaining focus can be suppressed.

Obviously, many modifications and variations of the present invention are possible in the light of the above teachings. It is therefore to be understood that within the scope of the appended claims the invention may be practiced otherwise than as specifically described.

What is claimed is:

1. A retrofocus imaging lens comprising in order from an object side:
    a first lens group having a positive refractive power as a whole constructed by a front-side first lens group having a negative refractive power as a whole and a rear-side first lens group having a positive refractive power as a whole; and
    a second lens group having a positive refractive power as a whole,
    wherein each of the front-side first lens group and the rear-side first lens group includes one positive lens and two negative lenses,
    the second lens group includes one or more positive lens and one or more negative lens, and
    a conditional expression (1) is satisfied $$-1.25 < f_{1a}/f_{1b} < -0.75 \quad (1)$$

where $f_{1a}$ denotes a focal length of the front-side first lens group, and $f_{1b}$ represents a focal length of the rear-side first lens group.

2. A retrofocus imaging lens according to claim 1, further comprising a rear focus mechanism for allowing the second lens group which functions as a focusing lens to travel toward the object along an optical axis, thereby allowing an image focal point position to remain unchanged even though a distance from the object changes from infinite to closest range,
    wherein a conditional expression(2) is satisfied $$2.0 < f_1/f < 6.0 \quad (2)$$

where $f_1$ denotes a focal length of the first lens group and f represents an overall focal length of the retrofocus imaging lens.

3. A retrofocus imaging lens according to claim 2, further comprising:
    an aperture stop disposed between the first and second lens groups; and
    a flare-cut aperture disposed between the aperture stop and the second lens group, the flare-cut aperture traveling together with the second lens group when focusing, thereby suppressing a comatic flare caused by a part of oblique incident light, the part being far from the optical axis.

4. A retrofocus imaging lens according to claim 1, wherein the front-side first lens group is constructed of four lenses which are, in order from the object side, a positive lens, two negative meniscus lenses each having a convex surface directed to the object side, and a positive lens, or constructed of three lenses which are, in order from the object side, two negative meniscus lenses each having a convex surface directed to the object side and a positive lens, and
    a conditional expression (3) is satisfied $$0.35 < f_n/f_{1a} < 0.65 \quad (3)$$

where $f_{1a}$ denotes a focal length of the front-side first lens group and $f_n$ denotes a synthetic focal length of the two negative meniscus lenses in the front-side first lens group.

5. A retrofocus imaging lens according to claim 1, wherein the rear-side first lens group is constructed of, in order from the object side, a biconvex positive lens, a negative meniscus lens having a convex surface directed to the image side, and a negative lens having a concave surface directed to the image side.

6. A retrofocus imaging lens according to claim 1, wherein the rear-side first lens group is constructed of, in order from the object side, a negative meniscus lens having a convex surface directed to the object side, a biconvex positive lens, and a negative lens having a concave surface directed to the image side.

7. A retrofocus imaging lens according to claim 1, wherein the second lens group is constructed of, in order from the object side, a positive lens having a convex surface directed to the image side, a negative lens having a concave surface directed to the object side, a positive meniscus lens having a convex surface directed to the image side, and a positive lens having a convex surface directed to the image side, a conditional expression (4) is satisfied, and at least one of dispersions $v_{2-i}$ (i=3 or 4) satisfies a conditional expression (5)

$$1.0 < f_1/f_2 < 4.0 \quad (4)$$

$$60 < v_{2-i} \quad (5)$$

where $f_1$ denotes a focal length of the first lens group, $f_2$ represents a focal length of the second lens group, and $v_{2-i}$ denotes a dispersion for a d-line of light of the i-th lens from the object side in the second lens group.

8. A retrofocus imaging lens comprising in order from an object side:

a first lens group having a positive refractive power as a whole constructed by a front-side first lens group having a negative refractive power as a whole and a rear-side first lens group having a positive refractive power as a whole; and a second lens group having a positive refractive power as a whole, wherein the front-side first lens group includes two or more negative lenses, the rear-side first lens group includes one negative lens and two or more positive lenses, the second lens group includes one or more positive lens and one or more negative lens, and a conditional expression (1) is satisfied $$-1.25 < f_{1a}/f_{1b} < -0.75 \quad (1)$$

where $f_{1a}$ denotes a focal length of the front-side first lens group, and $f_{1b}$ represents a focal length of the rear-side first lens group.

9. A retrofocus imaging lens according to claim 8, further comprising a rear focus mechanism for allowing the second lens group which functions as a focusing lens to travel toward the object along an optical axis, thereby allowing an image focal point position to remain unchanged even though a distance from the object changes from infinite to closest range, wherein a conditional expression(2) is satisfied $$2.0 < f_1/f < 6.0 \quad (2)$$

where $f_1$ denotes a focal length of the first lens group and f represents an overall focal length of the retrofocus imaging lens.

10. A retrofocus imaging lens according to claim 9, further comprising:

an aperture stop disposed between the first and second lens groups; and a flare-cut aperture disposed between the aperture stop and the second lens group, the flare-cut aperture traveling together with the second lens group when focusing, thereby suppressing a comatic flare caused by a part of oblique incident light, the part being far from the optical axis.

11. A retrofocus imaging lens according to claim 8, wherein the front-side first lens group is constructed of two negative meniscus lenses each having a convex surface directed to the object side, the rear-side first lens group is constructed of, in order from the object side, a biconvex positive lens, a negative meniscus lens having a convex surface directed to the image side, and a positive meniscus lens having a convex surface directed to the image side, and a conditional expression (6) is satisfied $$-5.5 < f_5/f_{1a} < -4.0 \quad (6)$$

where $f_5$ denotes a focal length of the fifth lens from the object side and $f_{1a}$ denotes a focal length of the front-side first lens group.

12. A retrofocus imaging lens according to claim 8, wherein the second lens group is constructed of, in order from the object side, a positive lens having a convex surface directed to the image side, a negative lens having a concave surface directed to the object side, a positive meniscus lens having a convex surface directed to the image side, and a positive lens having a convex surface directed to the image side, a conditional expression (4) is satisfied, and at least one of dispersions $v_{2-i}$ (i=3 or 4) satisfies a conditional expression (5)

$$1.0 < f_1/f_2 < 4.0 \quad (4)$$

$$60 < v_{2-i} \quad (5)$$

where $f_1$ denotes a focal length of the first lens group, $f_2$ represents a focal length of the second lens group, and $v_{2-i}$ denotes a dispersion for a d-line of light of the i-th lens from the object side in the second lens group.

* * * * *